(12) United States Patent
Clymer et al.

(10) Patent No.: US 11,250,978 B2
(45) Date of Patent: Feb. 15, 2022

(54) SYSTEM AND METHOD FOR PERTURBING A PERMANENT MAGNET ASYMMETRIC FIELD TO MOVE A BODY

(71) Applicant: GREEN WAVE POWER SYSTEMS LLC, Haddam, CT (US)

(72) Inventors: Mark Lawrence Clymer, Moodus, CT (US); Brenda Lee McConnell, Moodus, CT (US)

(73) Assignee: GREEN WAVE POWER SYSTEMS LLC, Haddam, CT (US)

( * ) Notice: Subject to any disclaimer, the term of this patent is extended or adjusted under 35 U.S.C. 154(b) by 0 days.

(21) Appl. No.: 17/326,609

(22) Filed: May 21, 2021

(65) Prior Publication Data
US 2021/0335528 A1 Oct. 28, 2021

Related U.S. Application Data

(63) Continuation of application No. 17/139,458, filed on Dec. 31, 2020, now Pat. No. 11,017,927, which is a
(Continued)

(51) Int. Cl.
*H01F 7/02* (2006.01)
*H01F 1/00* (2006.01)
(Continued)

(52) U.S. Cl.
CPC ............ *H01F 7/0205* (2013.01); *F03G 3/08* (2013.01); *H01F 1/00* (2013.01); *H01F 1/0036* (2013.01); *H01F 1/06* (2013.01); *H02K 7/02* (2013.01)

(58) Field of Classification Search
CPC ........ H01F 7/0205; H01F 1/0036; H01F 1/00; H01F 1/06; F03G 3/08; H02K 7/02
See application file for complete search history.

(56) References Cited

U.S. PATENT DOCUMENTS

| 4,795,929 A | 1/1989 | Elgass et al. |
| 4,843,268 A | 6/1989 | Hovorka |
| (Continued) |

FOREIGN PATENT DOCUMENTS

| CN | 101814871 A | 8/2010 |
| DE | 39 31 611 A1 | 3/1990 |
| (Continued) |

OTHER PUBLICATIONS

IP.com Search Results.*
(Continued)

*Primary Examiner* — Mohamad A Musleh
(74) *Attorney, Agent, or Firm* — McCormick, Paulding & Huber PLLC

(57) ABSTRACT

A system and method for perturbing a permanent magnet asymmetric field to move a body includes a rotating body configured to rotate about a rotation axis, a permanent magnet arrangement arranged on the rotating body containing two or more permanent magnets, and a perturbation element. The permanent magnet arrangement is configured such that an asymmetric magnetic field is generated by the permanent magnets about a perturbation point. Actuation of the perturbation element at or near the perturbation point causes a tangential magnetic force on the rotating body and/or the permanent magnet arrangement, thereby causing the rotating body to rotate about the rotation axis. The disclosure may also be used for linear motion of a body.

30 Claims, 16 Drawing Sheets

Related U.S. Application Data continuation-in-part of application No. PCT/IB2020/052039, filed on Mar. 9, 2020.

(60) Provisional application No. 62/917,940, filed on Jan. 9, 2019.

(51) Int. Cl.
*H01F 1/06* (2006.01)
*F03G 3/08* (2006.01)
*H02K 7/02* (2006.01)

(56) References Cited

U.S. PATENT DOCUMENTS

| | | | |
|---|---|---|---|
| 4,924,130 A | 5/1990 | Fratta | |
| 4,944,270 A | 7/1990 | Matsushita et al. | |
| 4,991,836 A * | 2/1991 | Joffe | A63F 9/34 273/239 |
| 5,896,961 A | 4/1999 | Aida et al. | |
| 5,959,758 A | 9/1999 | Seo | |
| 6,025,667 A | 2/2000 | Narita et al. | |
| 6,107,793 A | 8/2000 | Yokotani et al. | |
| 6,232,689 B1 | 5/2001 | Fujita et al. | |
| 6,577,037 B2 | 6/2003 | Killen et al. | |
| 6,682,430 B2 | 1/2004 | Killen | |
| 6,703,829 B2 | 3/2004 | Tola | |
| 6,707,446 B2 | 3/2004 | Nakamura et al. | |
| 7,148,680 B2 | 12/2006 | Mizutani et al. | |
| 7,250,702 B2 | 7/2007 | Abou Akar et al. | |
| 7,453,177 B2 | 11/2008 | Highfill et al. | |
| 7,994,674 B2 | 8/2011 | McClellan | |
| 8,299,741 B2 | 10/2012 | Prasanna | |
| 8,704,626 B2 | 4/2014 | Fullerton et al. | |
| 9,062,654 B2 | 6/2015 | Yost | |
| 9,331,534 B2 | 5/2016 | Yost | |
| 9,960,647 B2 | 5/2018 | Vann | |
| 10,110,109 B2 | 10/2018 | Farquharson | |
| 10,125,814 B2 * | 11/2018 | Walsh | F16C 32/0408 |
| 10,305,360 B2 | 5/2019 | Rustvold et al. | |
| 2002/0050902 A1 | 5/2002 | Asano et al. | |
| 2003/0178103 A1 | 9/2003 | Harimoto et al. | |
| 2004/0064153 A1 | 4/2004 | Creighton, IV et al. | |
| 2004/0251757 A1 | 12/2004 | Porter, Sr. | |
| 2009/0200883 A1 | 8/2009 | Halstead | |
| 2011/0031837 A1 | 2/2011 | Kuritani et al. | |
| 2011/0198958 A1 | 8/2011 | Kozeka | |
| 2014/0213139 A1 | 7/2014 | Ferguson | |
| 2015/0167639 A1 | 6/2015 | Choi et al. | |
| 2015/0200582 A1 | 7/2015 | Headstrom | |
| 2018/0269767 A1 | 9/2018 | Diehl et al. | |

FOREIGN PATENT DOCUMENTS

| | | |
|---|---|---|
| EP | 1 670 126 A1 | 6/2006 |
| JP | 2010316502 A | 9/2010 |
| JP | 2016220505 B2 | 12/2016 |
| KR | 10-2004-0096994 A | 11/2004 |
| KR | 20190141306 A | 12/2019 |
| WO | 2011057423 A1 | 5/2011 |
| WO | 2018/106935 A2 | 6/2018 |

OTHER PUBLICATIONS

International Search Report for International Application No. PCT/IB2020/052039 dated Jun. 22, 2020.
Written Opinion for International Application No. PCT/IB2020/052039 dated Jun. 22, 2020.
International Search Report for International Application No. PCT/US2020/012880 dated May 8, 2020.
Written Opinion for International Application No. PCT/US2020/012880 dated May 8, 2020.
International Search Report for International Application No. PCT/US2021/040650 dated Oct. 25, 2021.
Written Opinion for International Application No. PCT/US2021/040650 dated Oct. 25, 2021.

* cited by examiner

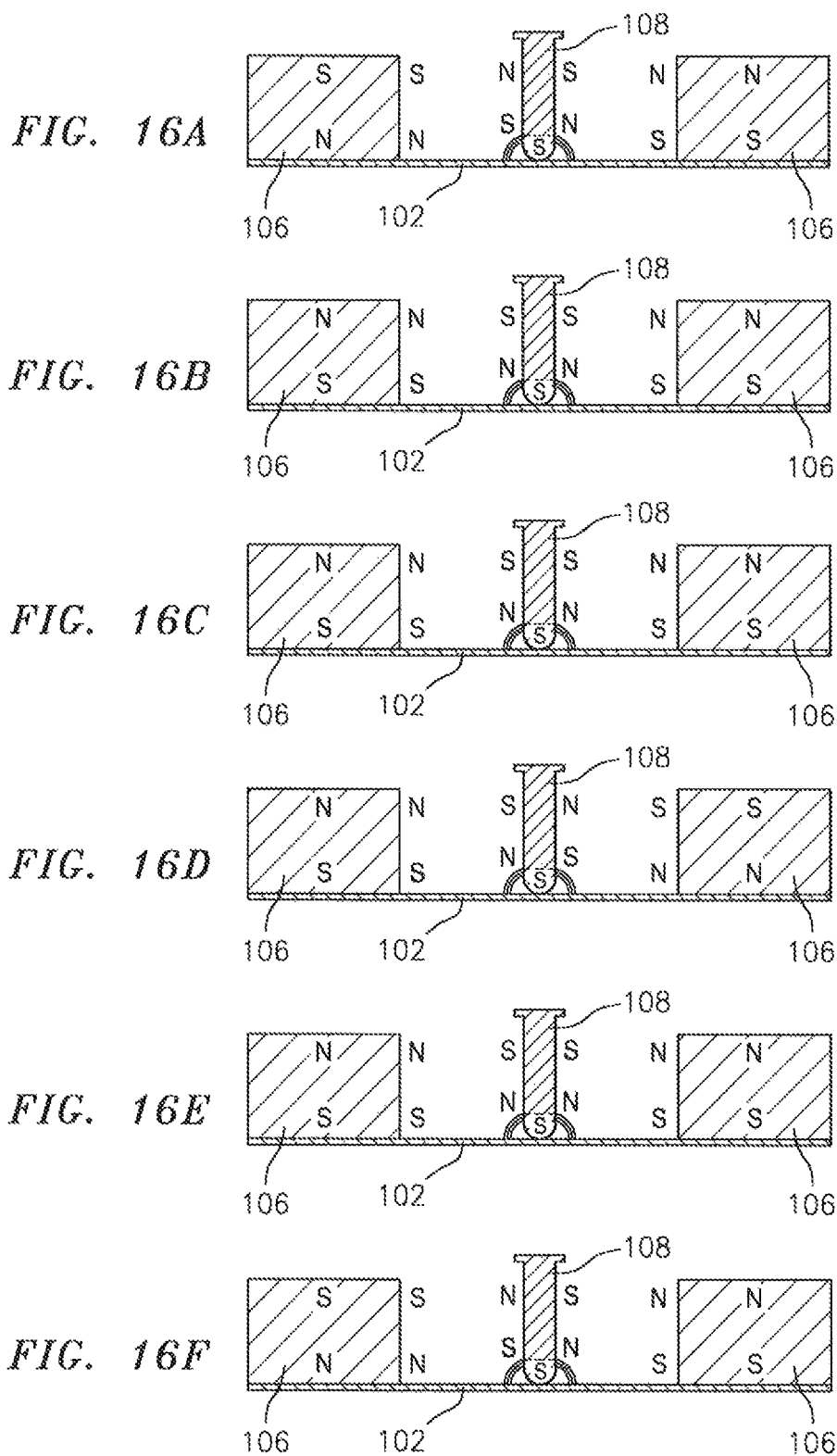

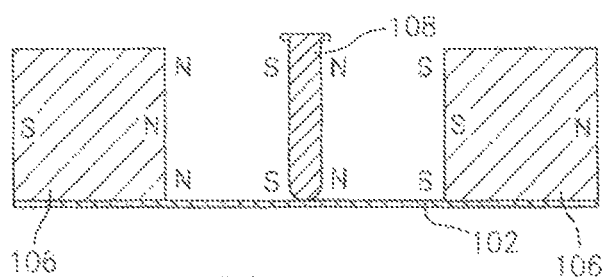
FIG. 25A
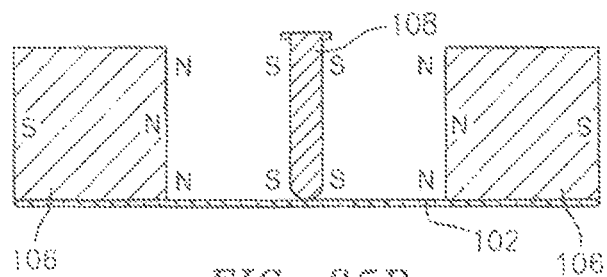
FIG. 25B
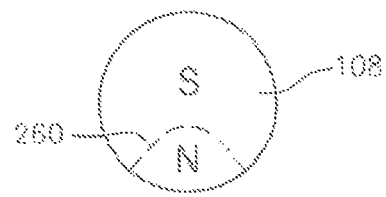
FIG. 26
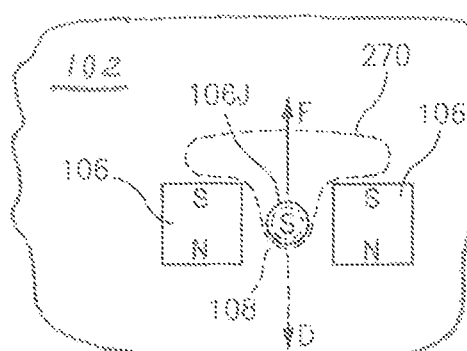 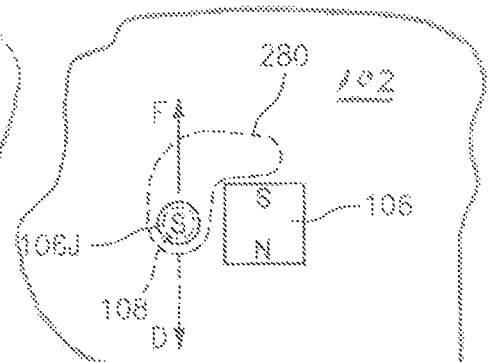
FIG. 27          FIG. 28

SYSTEM AND METHOD FOR PERTURBING A PERMANENT MAGNET ASYMMETRIC FIELD TO MOVE A BODY

CROSS-REFERENCE TO RELATED APPLICATION

This application is a continuation of U.S. patent application Ser. No. 17/139,458 filed on Dec. 31, 2020, which is a continuation-in-part of International Application No. PCT/IB2020/052039 filed on Mar. 9, 2020, which claims the benefit of U.S. Provisional Patent Application No. 62/917,940 filed on Jan. 9, 2019, each of which is hereby incorporated by reference in its entirety, to the fullest extent permitted under applicable law.

BACKGROUND

Systems and methods for causing mechanical motion of a body, including rotational mechanical motion are known. Conventional systems and methods are known for generating mechanical energy or work or motion, such as electric motors. However, such systems use significant electrical power to run and are often inefficient. Thus, it would be desirable to design a system and method which overcomes the shortcomings of the prior art discussed above and provides work or motion very efficiency using less energy than conventional systems.

BRIEF DESCRIPTION OF THE DRAWINGS

FIG. 16A is a schematic cross-sectional view of a permanent magnet arrangement of the permanent magnet asymmetric field system of FIG. 9 in accordance with embodiments of the present disclosure.

FIG. 16B is another schematic cross-sectional view of the permanent magnet arrangement of the permanent magnet asymmetric field system of FIG. 9 in accordance with embodiments of the present disclosure.

FIG. 16C is another schematic cross-sectional view of the permanent magnet arrangement of the permanent magnet asymmetric field system of FIG. 9 in accordance with embodiments of the present disclosure.

FIG. 16D is another schematic cross-sectional view of the permanent magnet arrangement of the permanent magnet asymmetric field system of FIG. 9 in accordance with embodiments of the present disclosure.

FIG. 16E is another schematic cross-sectional view of the permanent magnet arrangement of the permanent magnet asymmetric field system of FIG. 9 in accordance with embodiments of the present disclosure.

FIG. 16F is another schematic cross-sectional view of the permanent magnet arrangement of the permanent magnet asymmetric field system of FIG. 9 in accordance with embodiments of the present disclosure.

FIG. 25A is a schematic cross-sectional view of a permanent magnet arrangement of the permanent magnet asymmetric field system of FIG. 24 in accordance with embodiments of the present disclosure.

FIG. 25B is another schematic cross-sectional view of a permanent magnet arrangement of the permanent magnet asymmetric field system of FIG. 24 in accordance with embodiments of the present disclosure.

FIG. 26 is a cross-sectional polarity diagram of a perturbation element arranged in the permanent magnet asymmetric field system of FIG. 24 in accordance with embodiments of the present disclosure.

FIG. 27 is a top view of a permanent magnet arrangement for a permanent magnet asymmetric field system in accordance with embodiments of the present disclosure.

FIG. 28 is a top view of a permanent magnet arrangement for a permanent magnet asymmetric field system in accordance with embodiments of the present disclosure.

DETAILED DESCRIPTION

As discussed in more detail below, in some embodiments, the present disclosure is directed to systems and methods for perturbing a permanent magnet asymmetric field to provide motion of a body. The systems and methods of the present disclosure may use permanent magnets of any shape and size, based on the desired design parameters and may be configured with or without a housing. The present disclosure has a permanent magnetic arrangement resulting in an asymmetric magnetic field having potential energy stored in the magnetic field based on the magnetic (or flux) circuit configuration.

We have found that a small applied input force by a perturbation element that perturbs the asymmetric field causes a release of potential energy by the permanent magnet configuration that results in an output force greater than the applied input force (or force amplification), thereby providing a permanent magnet driven (or assisted) force amplifier.

Figure 1:
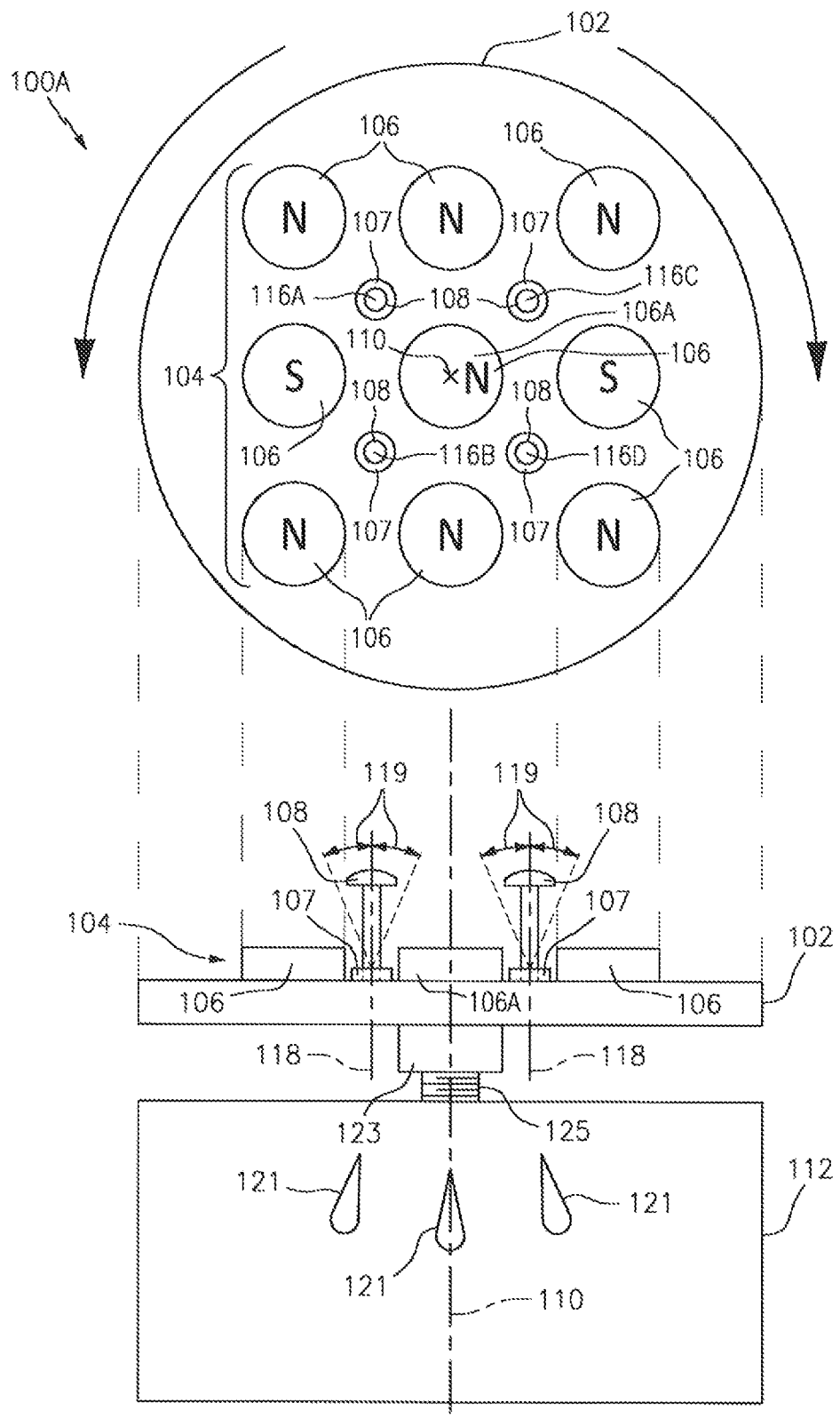
FIG. 1 is a top and side view of a permanent magnet asymmetric field system in accordance with embodiments of the present disclosure.
Figure 2:
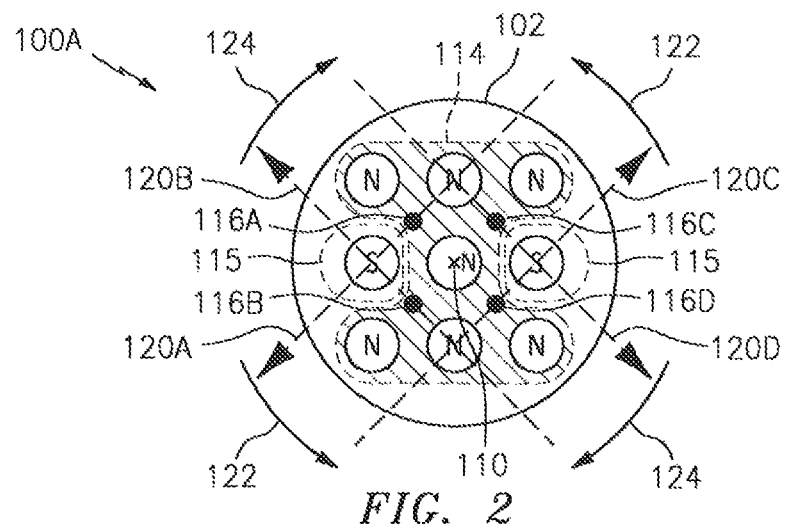
FIG. 2 is a top view of the permanent magnet asymmetric field system of FIG. 1 in accordance with embodiments of the present disclosure.

Referring to FIGS. 1 and 2, an exemplary embodiment of a permanent magnet asymmetric field system 100A is shown in accordance with embodiments of the present disclosure. The system 100A includes a rotating body (such as a flywheel) 102, a permanent magnet arrangement 104 having a plurality of permanent magnets 106, and a perturbation element (or a control rod or driver pin) 108. The rotating body 102 is configured to rotate about a rotation axis 110. The rotating body 102 is shown as being a connected to an alternator/generator 112, by a shaft 125, which may be attached to the body 102 by a bolt 123 or the like. Also, the alternator/generator 112 may have vent holes 121 to avoid overheating.

In this embodiment, the perturbation element 108 is a steel screw or nail or rod or pin constituting a ferrous body made of a ferrous material. This embodiment is shown with optional rests (or seats) 107 in the form of sockets for the tips of the perturbation elements 108. The rests 107 may be formed of plastic and/or metal, or any other material, or, in some embodiments may be divots or indentations in the bottom plate 102.

The permanent magnets 106 of the arrangement 104 are fixedly arranged on (or attached to) the rotating body 102 such that an asymmetric magnetic field is generated, with a resultant major magnetic field 114 (or major field 114) and minor magnetic field 115 (or minor field 115), about one or more perturbation points 116A, 116B, 116C, 116D (collectively "116"). Each perturbation point 116 has a cluster of four magnets 106 circumferentially surrounding the perturbation point 116, with each magnet 106 having an equal radial distance from the perturbation point 116 or substantially equal distance. Some clusters share one or more common magnets 106. In each cluster of magnets 106, there are three magnets 106 with an upper surface having the same north (N) polarity facing away from the rotating body 102 generating a major field and one magnet 106 with an upper surface having a south (S) polarity facing away from the rotating body 102 generating a minor field 115. Each perturbation point 116 has a perturbation axis 118 that is substantially parallel to the rotation axis 110. Also, there is a common magnet 106A located in the center of the configuration, about which the body 102 rotates.

If the body 102 (or bottom plate) is steel the magnets 1067 may be magnetically fixed or attached to the body 102; otherwise, the magnets 106 may be fixed to the body by bolts, glue, clamps, or other attachment means. They may also be embedded into the body if desired.

For the purposes of the present application, an asymmetric magnetic field comprising a "major" field and a "minor" field, with the major field 114 being larger in size than the minor field 115 and/or the major field 114 having a magnetic field strength greater than the minor field 115. In this embodiment, the magnets form a co-planar matrix pattern to form an H-pattern magnetic flux line of the major field 114. While this embodiment shows there being a greater number of magnets 106 for generating the major field 114 than the number of magnets 106 for generating the minor field 115, it is within the scope of the present disclosure for there to be a great number of magnets 106 for generating the minor field 115. For example, the magnets 106 generating the major 114 field may be less in number but "stronger" than the greater number of "weaker" magnets 106 generating the minor field. The magnets 106 for either field 114, 115 do not need to be of the same shape, size or strength, and there may be different magnet types/shapes for one or both fields 114, 115.

In this embodiment, the flywheel rotating body 102 is about 15" diameter×1.25" thick and is about eighty (80) pounds and is a automotive/truck flywheel. However, other size, shape and weight rotating bodies 102 are within the scope of the present disclosure. The alternator/generator 112 is a forty-eight (48) volt permanent magnet generator, model FREEDOM PMG made by Missouri Wind and Solar that reaches battery voltage at 266 rpm. However, other types of alternators/generators are within the scope of the present disclosure.

Various housing and magnet configurations are within the scope of the present disclosure. For example, and without limitation, the housing enclosing the permanent magnets 106 may be an enclosed high ferrous steel cylinder having an 8" outer diameter×7" inner diameter×2" height capped with an 8" diameter×¼" thick ferrous steel disc on the bottom and a 8" diameter×¼" thick aluminum cap on the top. As described herein, the cap, bottom, and sides) may be made of a ferrous material or non-ferrous material. The permanent magnets 106 may be, for example and without limitation, 1-1.25" diameter×0.5" thick (or high) NdFe/ cylindrical rare earth magnets, magnetized axially (or vertically). The permanent magnets 106 can be purchased "off-the-shelf" from K&J Magnetics, Part Number DX48.

In operation, when the perturbation element 108 is arranged at a perturbation point 116 (or near a perturbation point 116) in an initial position such that a longitudinal extension of the perturbation element 108 is parallel to the perturbation axis 118 (or perpendicular to a surface of the rotating body 102 at the perturbation point 116) and then actuated to deviate from the perturbation axis 118 through a provided input force (or applied force) in a direction 120A, 120B, 120C, 120D towards a central point of the minor field 115 and/or a central point of the magnet(s) 106 generating the minor field 115. A deviation 119 from the perturbation axis 118 is shown in FIG. 1. The perturbation element 108 may be inserted at a substantially central part of the perturbation point 116, but systems and methods may work when the perturbation element 108 is radially offset from the central part of the perturbation point 116. In this embodiment, the central point of the minor field 115 is in alignment with the central point of the magnet 106 having a south polarity (S) facing away from the rotating body 102 (or bottom plate). The actuation of the perturbation element 108 to deviate away from the perturbation axis 118 in this manner causes a distortion (or perturbation) of the asymmetric field 114, 115 and generates a resulting tangential magnetic force on the permanent magnet arrangement 104 and/or the rotating body 102 about the rotation axis 110, thereby causing the rotating body 102 to rotate about the rotation axis 110 in either a counter-clockwise direction 122 or clockwise direction 124 assuming the tangential magnetic force is greater than the friction and/or load resisting the tangential magnetic force. Advantageously, the permanent magnet arrangement 104 allows for counter-clockwise direction 122 rotation and clockwise direction 124 rotation, which may be considered a forward and reverse option of bi-directionality.

In some embodiments, rotation of the rotating body 102 may be caused by actuation of the perturbation element 108 to deviate from the perturbation axis 118 in any direction. For example, a wobble of a few degrees of the perturbation element 108 from the perturbation axis 118 will also cause rotation of the rotating body 102.

In embodiments according to the present disclosure, the input force required to actuate the perturbation element 108 to deviate from the perturbation axis 118 is less than the resulting tangential magnetic force acting on the rotating body 102. This is possible due to the potential energy contained in the permanent magnet arrangement 104 that generates a tangential magnetic force to drive the rotating body 102 to rotate about the rotation axis 110 that is larger than the input force (or applied force) provided. Thus, the present disclosure provides a permanent magnetic-driven force amplifier.

The rotation of the rotating body 102 may be used for any application fit for a rotating body to perform work, such as, for example, generating electricity, propelling an automobile, driving a propeller of a boat or airplane, and the like. For example, embodiments according to the present disclosure may facilitate rotation in wind turbines, significantly reducing the input energy required at startup to generate electricity, particularly at low wind speeds. Embodiments may facilitate rotation in horizontal wind turbines (or HAWT) or vertical wind turbines (or VAWT). Embodiments according to the present disclosure may be coupled with a flywheel and an alternator or generator of a wind turbine. Embodiments according to the present disclosure may be used in residential, commercial, and/or utility scale use applications.

The rotating body 102 may be caused to rotate as described by the perturbation of the asymmetric field by the single perturbation element 108. However, any number of perturbation elements 108 may be actuated at their respective perturbation points 116. For instance, a first perturbation element 108 may be actuated at the perturbation point 116A while a second perturbation element 108 is simultaneously (or substantially simultaneously) actuated at the perturbation point 116D to drive the rotating body 102 in a counter-clockwise direction. Similarly, a third perturbation element 108 may be actuated at the perturbation point 116B while a fourth perturbation element 108 is simultaneously (or substantially simultaneously) actuated at the perturbation point 116C to drive the rotating body 102 in a clockwise direction. While the additional perturbation elements 108 are shown as being actuated at opposing perturbation points 116, in other embodiments the additional perturbation elements 108 are not at opposing perturbation points 116 about the rotation axis. For example, the perturbation elements 108 may be at perturbation points 116 at 30°, 45° or 90° angular separation. However, any other degree of angular separation is within the scope of the present disclosure. Depending on the number of magnets 106 and shape/configuration of the permanent magnet arrangement, there may be any number of perturbation elements 108 and/or perturbation points 116. The additional perturbation elements 108 and perturbation points 116 provide the ability to provide additional tangential magnetic force to the rotating body 102 depending on the strength of the magnets 106.

The magnets 106 shown and described in the embodiment of FIGS. 1 and 2 are cylindrical magnets. However, any type or shape of magnet is within the scope of the present disclosure. For example, the magnets 106 may be rectangular bar magnets, circular flat (or disc) magnets, or the like.

While the perturbation elements 108 has been shown and described as being a steel screw, it is within the scope of the present disclosure for the perturbation element 108 to be virtually any size and shape, and be made of any ferrous material, such as, for example, steel, steel alloys, iron, iron alloys, and the like. The perturbation element 108 may also be a permanent magnet, such as, for example, a conical magnet, a cylindrical magnet, or the like. A perturbation element 108 in the form of a magnet may provide for greater amplification of the input force (or applied force) by providing greater distortion or perturbation of the asymmetric magnetic field than a similar mass, size and/or shape ferrous body perturbation element 108. The mass, size and shape of the perturbation element 108 may be adjusted as desired to achieve the desired magnetic field perturbation properties of the perturbation element 108, for example, strength or tuning the amount of tangential magnetic force per degree or distance of actuation 119 of the perturbation element 108. In some embodiments, greater amplification of the input force may be achieved by arranging a bias magnet to the ferrous control rod with the same polarity as the polarity of the side of the magnets 106 facing away from the rotating body 102 that generate the minor field 115 is arranged on the upper, or distal end, of the perturbation element 108.

Figure 3:
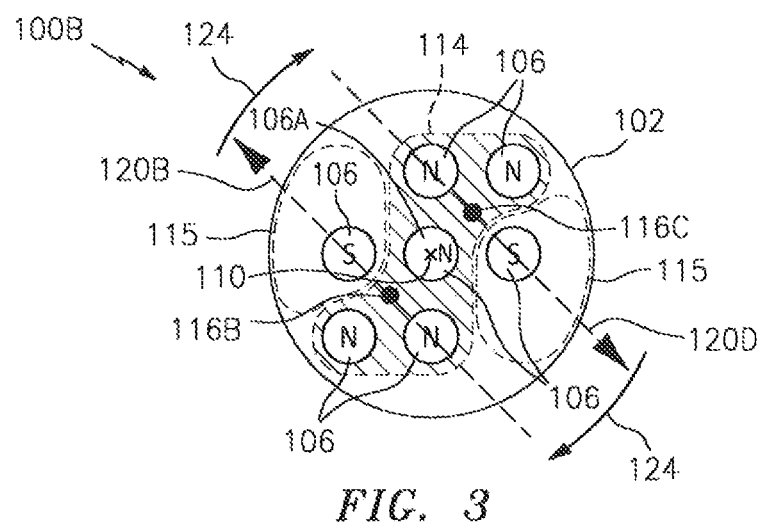
FIG. 3 is a top view of a permanent magnet asymmetric field system in accordance with embodiments of the present disclosure.

Referring to FIG. 3, a permanent magnet asymmetric field system 100B is shown that is substantially the same as the permanent magnet asymmetric field system 100A of FIGS. 1 and 2 except that two of the magnets 106 are removed. In this embodiment, the system 100B only has two clusters of four magnets 106 surrounding two perturbation points 116B, 116C with a common central magnet 106A. The system 100B operates in the same manner under the same principles as shown and described above in connection with the system 100A FIGS. 1 and 2. One difference between the system 100B shown in FIG. 3 and the system 100A of FIGS. 1 and 2, is that the permanent magnet arrangement 104 of the system 100B only generates an asymmetric field 114, 115 about two perturbation points 116B, 116C that can be perturbed to generate tangential magnetic forces 120B, 120D, which result in rotation in the same direction, the clockwise direction 124.

Figure 4:
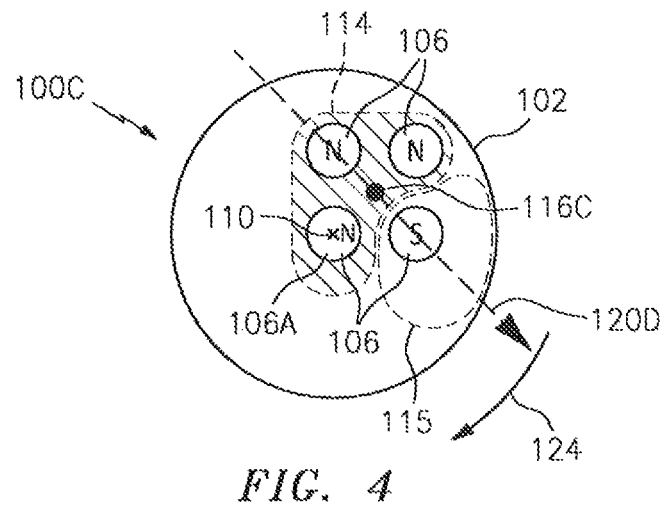
FIG. 4 is a top view of a permanent magnet asymmetric field system in accordance with embodiments of the present disclosure.

Referring to FIG. 4, a permanent magnet asymmetric field system 100C is shown that is substantially the same as the permanent magnet asymmetric field system 100A of FIGS. 1 and 2 except that five of the magnets 106 are removed. In this embodiment, the system 100C only has one cluster of four magnets 106 surrounding one perturbation point 116C and the body rotates about the center of the magnet 106A. The system 100C operates in the same manner under the same principles as shown and described above in connection with the system 100A FIGS. 1 and 2. One difference between the system 100C shown in FIG. 4 and the system 100A of FIGS. 1 and 2, is that the permanent magnet arrangement 104 of the system 100C only generates an asymmetric field 114 about one perturbation point 116C that can be perturbed to generate a tangential magnetic force 120D, which results in rotation in one direction, the clockwise direction 124.

Figure 5:
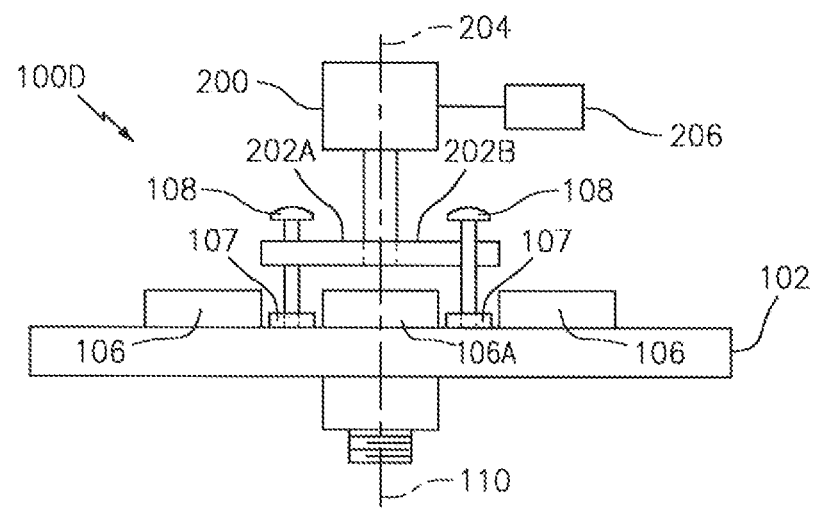
FIG. 5 is a side view of a permanent magnet asymmetric field system in accordance with embodiments of the present disclosure.
Figure 6:
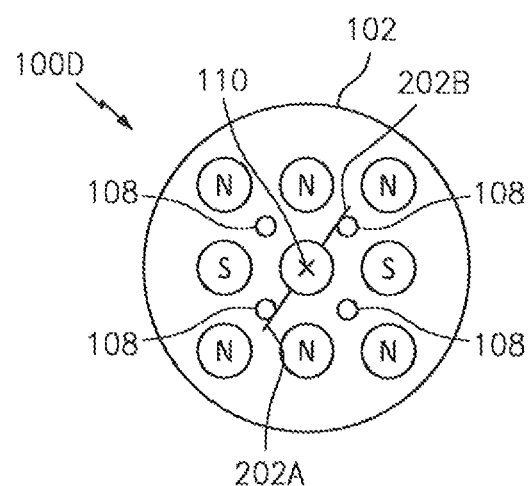
FIG. 6 is a top view of the permanent magnet asymmetric field system of FIG. 5 in accordance with embodiments of the present disclosure.

Referring to FIGS. 5 and 6, a permanent magnet asymmetric field system 100D is shown that is substantially the same as the permanent magnet asymmetric field system 100A of FIGS. 1 and 2. The system 100D includes an actuation input device 200. In this embodiment, the actuation input device 200 is an electric motor having an output shaft configured to rotate two actuation arms 202A, 202B (collectively "202") about an actuation rotation axis 204 that is substantially parallel to or the same as the rotation axis 110. The actuation input device 200 is in operative communication with a controller 206 configured to control the actuation force provided by the actuation arms 202 and the timing of their actuation. The electric motor 200 is a twelve (12) volt DC high-rpm, low-torque direct current motor, model XD-3420, DC 12 volt, 3,000 RPM, similar to that used in radio controlled cars and toys and small industrial actuator applications.

Figure 7:
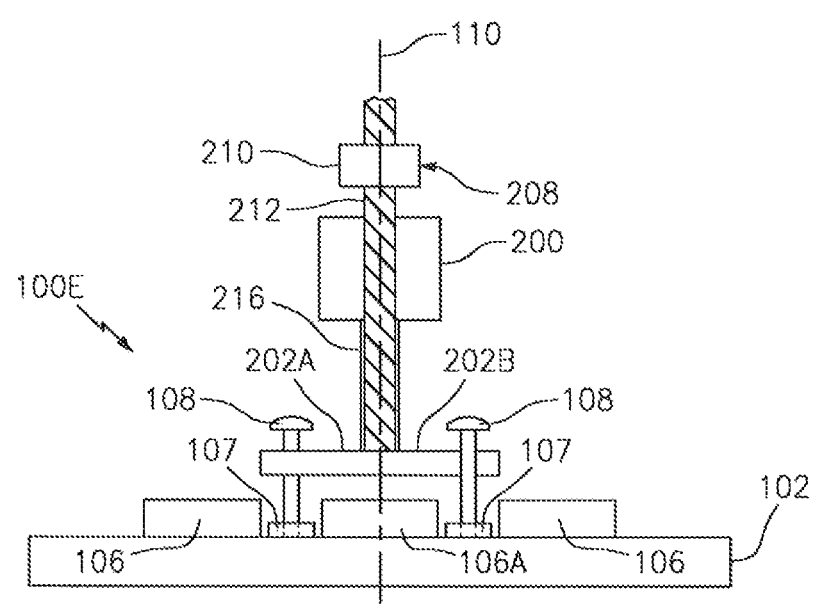
FIG. 7 is a side view of a permanent magnet asymmetric field system in accordance with embodiments of the present disclosure.

Referring to FIG. 7, a permanent magnet asymmetric field system 100E is shown that is substantially the same as the permanent magnet asymmetric field system 100D of FIGS. 5 and 6. The system 100E includes a force assist device 208 that applies force (or pressure) against the actuation arms 202. The force assist device 208 distributes the weight of a threaded weighted-element 210 (e.g. 2.2 lbs) through a threaded drive screw mechanism 212 such as a spiral gear or helical gear with high helix angle cause against the arms 202 to apply a force against the pins 108. The assistance of the force assist device 208 maintains against the pins 108 by against the arms 202 to assist the motor and to reduce the impact of vibrations or disturbances from causing a separation of the arms 202 from the perturbation elements 108 that would otherwise cause non-uniform rotation of the rotating body 102. While the force assist device 208 in this embodiment is a "gravity" type force assist device, other force assist devices that utilize active force assist are within the scope of the present disclosure. In that case, the motor shaft 216 and screw drive shaft 212 both drive the arms 202A to put force on the perturbation pins 108.

Referring to FIGS. 8, 9 and 16A-16F, a permanent magnet asymmetric field system 100F is shown in accordance with embodiments of the present disclosure. The system 100F includes two permanent magnet arrangements 104A, 104B arranged on the rotating body 102, each of the arrangements 104A, 104B having four permanent magnets 106 around a perturbation point 116E, 116F, and having the perturbation element 108 extending from the same, similar to the system 100B of FIG. 3 except that the arrangements 104A, 104B do not share any common permanent magnets in the clusters (or permanent magnetic arrangements) surrounding the perturbation points 116E, 116F. The arrangements 104A, 104B are arranged radially offset from the rotation axis 110. It is within the scope of the present disclosure to configure the permanent magnet arrangement(s) 104 to locate the perturbation point(s) 116 at a desired radial distance (d), e.g. 8 inches, from the rotation axis 110. The boundary lines 902, 904 approximate the magnetic boundary field lines between the majority north field and the minority south field in the arrangements 104A, 104B. The arrangement of the magnets 106 generates a magnetic field force that forces a perturbation element 108, if present, towards a default direction D. The perturbation and operation of the arrangements 104A, 104B are substantially as discussed above in connection with other embodiments. One or both of the perturbation points 116E, 116F may have the perturbation element 108 actuated therein in order to perturb the asymmetric magnetic field(s). The resulting tangential magnetic forces 320A, 320B from the perturbation(s) on the arrangements 104A, 104B, which is in a direction opposite to the default direction D, will cause the rotating body 102 to rotate about the rotation axis 110. Each arrangement 104A, 104B is arranged in an optional housing 300A, 300B. Also, any number of the arrangements 104A or 104B may be disposed around the perimeter of the rotating body 102.

A schematic cross-sectional view of the permanent magnet arrangement 104B along line 16A is shown in FIG. 16A; along line 16B in FIG. 16B; along line 16C in FIG. 16C; along line 16D in FIG. 16D; along line 16E in FIG. 16E; and along line 16F in FIG. 16F. As shown in FIGS. 16A-16F, when a ferrous body perturbation element 108 is arranged at the perturbation point 116F, the perturbation element 108 has an opposite polarity as the polarity of the magnet 106 at a portion of the perturbation element 108 facing the permanent magnet 106. For example, as shown in FIG. 16A, the top left portion of the perturbation element 108 has a north polarity as it is facing the left permanent magnet 106, which has a south polarity at that height (in the direction of the extension of the perturbation element 108); and the bottom left portion of the perturbation element 108 has a south polarity as it is facing the left permanent magnet 106, which has a north polarity at that height. This polarity pattern is true for each portion of the perturbation element 108 facing each magnet 106.

Each arrangement 104A, 104B is enclosed in a 5" outer diameter×4" inner diameter×1.5" height enclosed ferrous steel cylinder housing 300A, 300B capped on top with a 5" diameter ¼" thick aluminum disc and a bottom plate of same dimensions made of steel. However, as discussed herein, other housing 300A, 300B configuration shapes and sizes are within the scope of the present disclosure. Also, as discussed above, the housings 300A, 300B are optional and the permanent magnets 106 may be arranged or fixed directly on the rotating body 102. In this embodiment, the rotating body 102 is the 80 lb flywheel discussed hereinbefore. However, other rotating body 102 size, shape and materials are within the scope of the present disclosure. The rotating body 102 may be made of ferrous or non-ferrous materials.

Figure 8:
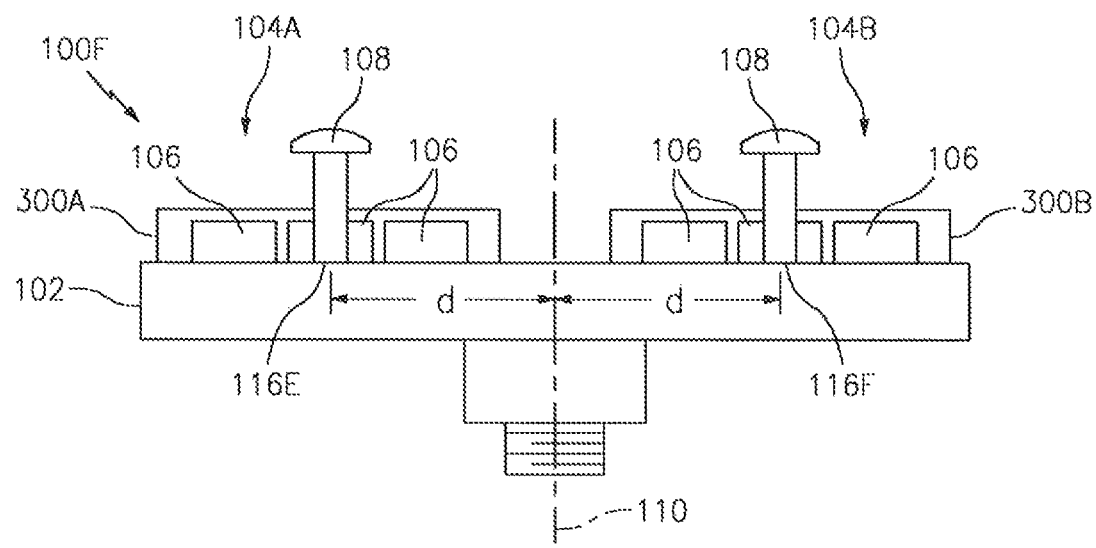
FIG. 8 is a side view of a permanent magnet asymmetric field system in accordance with embodiments of the present disclosure.
Figure 9:
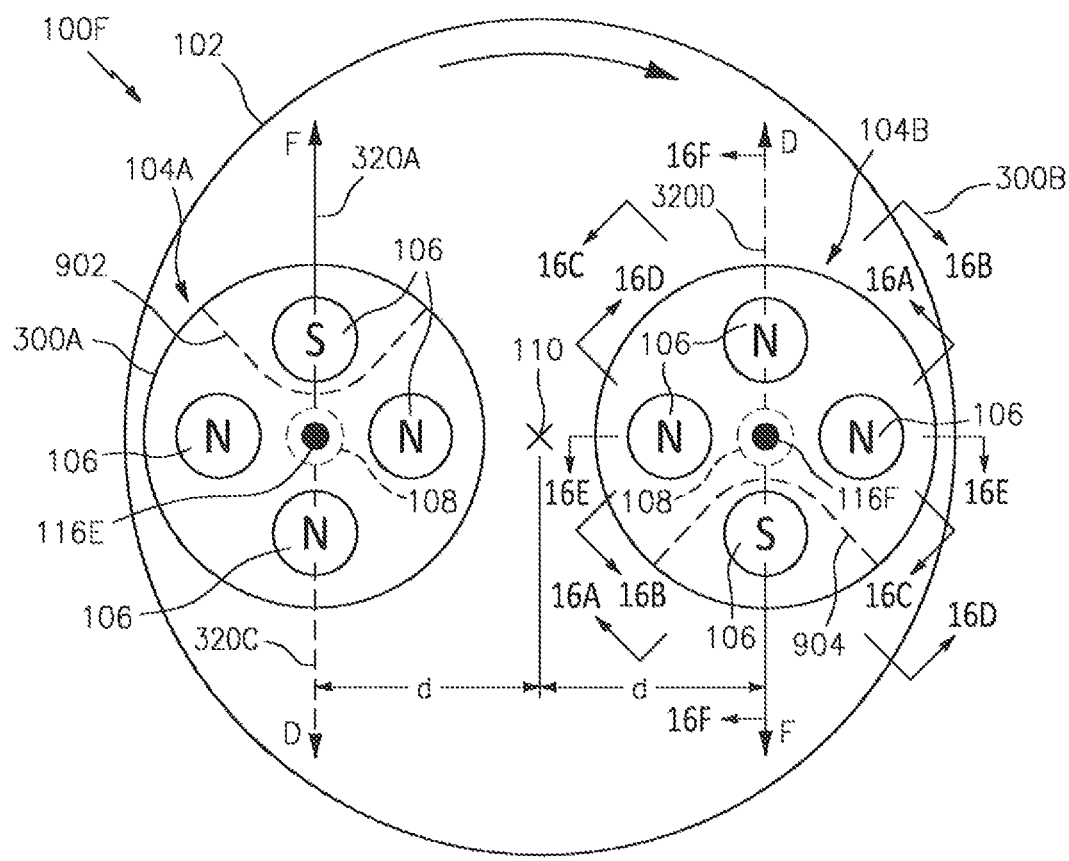
FIG. 9 is a top view of the permanent magnet asymmetric field system of FIG. 8 in accordance with embodiments of the present disclosure.

Also, the motor drive and/or spiral gear arrangement with rotating arms to press against the perturbation pins 108 shown in FIGS. 5-7 may be used with this embodiments of FIGS. 8 and 9.

Figure 10:
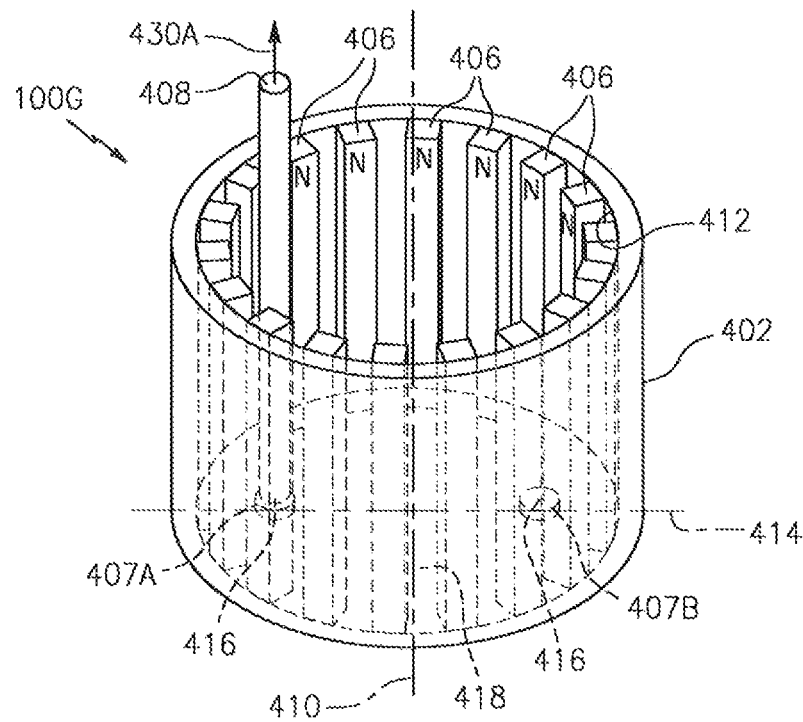
FIG. 10 is a perspective view of a permanent magnet asymmetric field system in accordance with embodiments of the present disclosure.
Figure 11:
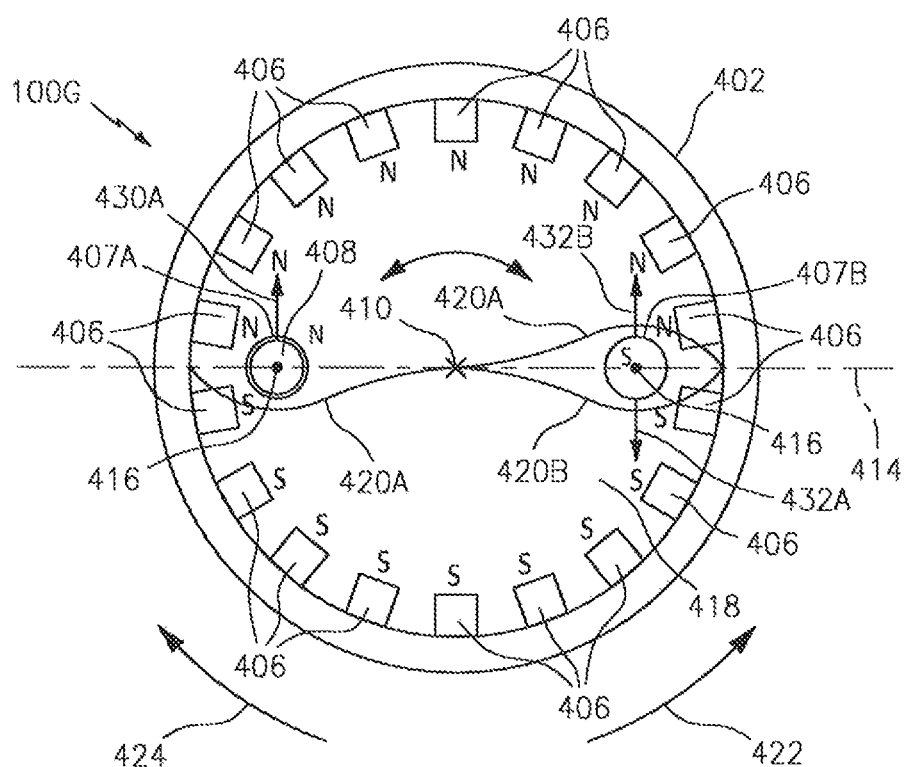
FIG. 11 is a top view of the permanent magnet asymmetric field system of FIG. 10 in accordance with embodiments of the present disclosure.

Referring to FIGS. 10 and 11, a permanent magnet asymmetric field system 100G is shown in accordance with embodiments of the present disclosure. The system 100G includes a cylindrically-shaped rotating body 402, a plurality of wall magnets 406, two cylindrical bias magnets 407A, 407B (collectively "407") and a perturbation element 408. The rotating body 402 is configured to rotate about a rotation axis 410. The wall magnets 406 are arranged on an inner circumferential wall 412 of the rotating body 402. The wall magnets 406 on one side of an imaginary equator 414 that bifurcates the rotating body 402 have a side facing the rotation axis 410 with a north polarity (N) and the wall magnets 406 on the opposite side of the imaginary equator 414 have a side facing the rotation axis 410 with south polarity (S). The bias magnets 407 are arranged at the perturbation points 416 on a bottom surface 418 of the rotating body 402, are aligned on an "equator" 414 and are radially offset from the rotation axis 410. The upper surfaces of the bias magnets 407 facing away from the bottom surface 418 have different polarities. In particular, the upper surface of the bias magnet 407A has north polarity (N) and the upper surface of the bias magnet 407B has south polarity (S).

In some embodiments, the wall magnets 406 are rectangular permanent magnets that are 3" long, ½" wide and ¼" thick; the bias magnets are cylindrical magnets that are ¼" diameter and ⅛" thick; the housing has an outer diameter of 4", an inner diameter of 3.5" and a height of 4". The housing has an open top, but fully enclosed cylinders or cylindrically-shaped housings are within the scope of the present disclosure as are other shapes such as rectangles, ovals, triangles, etc. In some embodiments, the housing is made of a ferrous material and in other embodiments the housing is made of a non-ferrous material. In some embodiments, the housing has some ferrous material and some non-ferrous material, e.g., a cylindrically-shaped housing with a wall 412 and bottom surface 418 made of a ferrous material (e.g., steel) and a top made of a non-ferrous material (e.g., plastic or aluminum). However, other dimensions, shapes and material choices are within the scope of the present disclosure and may be changed as the application requires or is desired.

The wall magnets 406 and bias magnets 407 generate a magnetic flux field line 420A that deviates from the equator 414 near the bias magnets 407, but intersects the equator 414 substantially near the point where the rotation axis 410 intersects the equator 414. Specifically, the magnetic flux field line 420A deviates from the equator 414 towards the wall magnets 406 having a side facing the rotation axis 410 that is of opposite polarity to the upper surface of the bias magnets 407. The configuration of the magnetic flux field line 420A causes two perturbation points 416 located substantially at the location of the bias magnets 407. The bias magnets 407 may be located about a third of the distance from the inner walls to the center of rotation 410.

In operation, the perturbation element 408 is inserted into the rotating body 402 at (or substantially at) either of the perturbation points 416 such that a longitudinal extension of the perturbation element 408 is parallel or substantially parallel to the rotation axis 410. The perturbation element 408 is then actuated to move or tilt toward the magnetic flux field line 420A in the direction 430A. The actuation of the perturbation element perturbs the asymmetric magnetic flux field line 420A and generates a resulting tangential magnetic force on the wall magnets 406, bias magnets 407 and/or the rotating body 402 about the rotation axis 410, thereby causing the rotating body 402 to rotate about the rotation axis 410 in a counter-clockwise direction 422 assuming the tangential magnetic force is greater than the friction and/or load resisting the tangential magnetic force. As discussed above in connection with other embodiments, there may be an additional perturbation element 408 (not shown) such that there is a perturbation element 408 actuated at both perturbation points 416 simultaneously, if desired, which may provide twice the rotational force on the body 402.

In some embodiments, the upper surface of the bias magnets 407 may have the same polarity (N—N; or S—S). In such embodiments, for a N—N arrangement, the magnetic flux field line would have the shape of the magnetic flux field line 420B on the right side of the axis 410. This configuration allows for bi-directional rotation of the body 402. For instance, a perturbation element 408 actuated at the perturbation point 416 at the bias magnet 407A, in the direction 430A, would cause counter-clockwise 422 rotation of the rotating body 402, while actuation of the perturbation element 408 (or actuation of a second perturbation element 408) at the perturbation point 416 at the bias magnet 407B, in the direction 432B, would cause clockwise 424 rotation of the rotating body 402.

One of the two bias magnets 407 is optional and may be removed. For example, if the bias magnet 407B is removed, then the magnetic flux field line 420A would only deviate from the equator substantially at the single bias magnet 407A. In this embodiment, there would only be one perturbation point 416 at the single bias magnet 407A.

Figure 12:
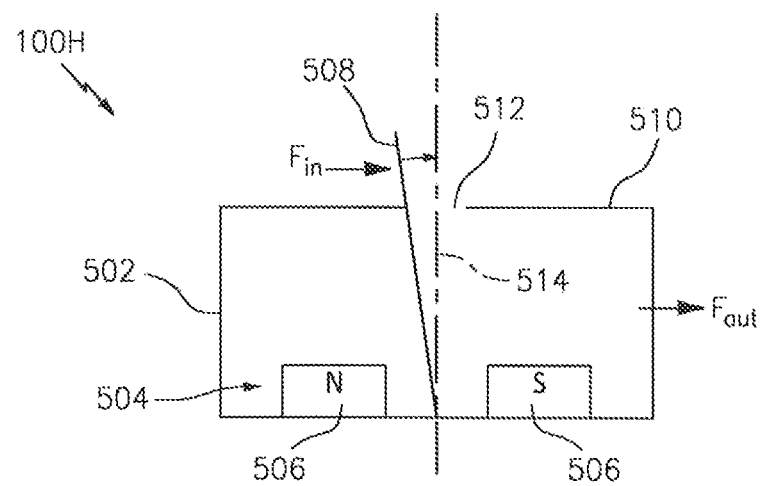
FIG. 12 is a side view of a permanent magnet asymmetric field system in accordance with embodiments of the present disclosure.

Referring to FIG. 12, a permanent magnet asymmetric field system 100H is shown in accordance with embodiments of the present disclosure. The system 100H includes a rotating body 502, a permanent magnet arrangement 504 having a plurality of magnets 506 similar to the arrangements 300A, 300B in FIGS. 8 and 9 and a perturbation element 508. The system 100H further includes a perturbation element guide (or support) 510 defining a perturbation element opening 512. The perturbation element opening 512 is configured to receive the perturbation element 508 and is located around a perturbation axis 514 that would cause motion of the rotating body 502 if the perturbation element 508 is actuated to deviate from the perturbation axis 518 or towards a magnetic flux field line as discussed herein in connection with other embodiments. The perturbation element guide 510 serves to limit the range of deviation of the perturbation element 508 from the perturbation axis 514 (or distance 119 (FIG. 1) from a magnetic flux field line). The guide 510 may advantageously prevent the perturbation element 508 from by an actuating device such as an electric motor and/or gravity weight such as in FIGS. 5-7, i.e., being actuated by a distance greater than required or desired. The guide 510 may also advantageously constitute a stop to prevent the perturbation element 508 from being moved by the magnets 506 when the perturbation element 508 is not being actuated or held by an actuating device. The guide 510 may be a cover or cap with a hole 512 and may be used with any embodiment herein to limit the range of motion of the perturbation element 508.

The perturbation element opening 512 may be any size or shape as is desired or as the application requires. For example, the perturbation element opening 512 may be a circular hole, a straight slot, a curved slot or a zig-zag slot. However, other shapes are within the scope of the present application.

Figure 13:
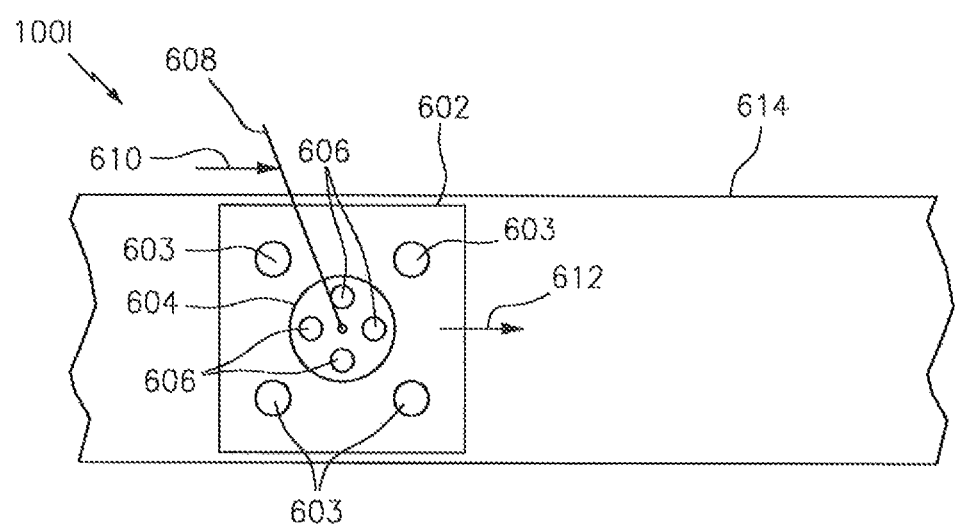
FIG. 13 is a top view of a permanent magnet asymmetric field system in accordance with embodiments of the present disclosure.

Referring to FIG. 13, while the embodiments discussed above have been in connection with systems having a rotating body that rotates about a rotation axis, permanent magnet asymmetric field systems that generate non-rotation motion (e.g. translational or linear motion) are within the scope of the present disclosure. For example, referring to FIG. 13, a permanent magnet asymmetric field system 100I is shown in accordance with embodiments of the present disclosure. The system 100I includes a linear motion body 602 having a plurality of bearings (or wheels) 603, a permanent magnet arrangement 604 having a plurality of magnets 606, and a perturbation element 608. The permanent magnet arrangement 604 generates a major field and minor field as discussed above in connection with other embodiments. When the perturbation element 608 is deviated or moved towards the minor field in a direction 610, the resulting magnetic force on the magnets 606 and/or the linear motion body 602 causes the linear motion body 602 to move in the direction 612. The bearings 603 serve to reduce the friction or resistance the linear motion body 602 may encounter in being forced to move in the direction 612.

The linear motion body 602 is shown as being arranged in an optional linear track 614 which may have guard rails. The linear track 614 confines the linear motion body 602 to prevent the linear motion body 602 from moving in any non-linear directions from the track 614. The bi-directionality discussed above in connection with rotating embodiments is also applicable to linear motion embodiments. In particular, there may be a magnet arrangement where perturbation of the perturbation element 608 (or a different perturbation element) causes the linear motion body 602 to move in the opposite linear direction, thereby giving a forward and reverse control of the system 100I.

Referring to FIGS. 14, 15 and 17A-17F, a permanent magnet asymmetric field system 100J is shown in accordance with embodiments of the present disclosure. The system 100J includes two permanent magnet arrangements 104C, 104D arranged on the rotating body 102, each of the arrangements 104C, 104D having five permanent magnets 106 around a perturbation point 116G, 116H. The central permanent magnet 106J of each arrangement 104C, 104D is arranged at the respective perturbation point 116G, 116H. The arrangements 104C, 104D are arranged radially offset from the rotation axis 110. It is within the scope of the present disclosure to configure the permanent magnet arrangement(s) 104 to locate the perturbation point(s) 116 at a desired radial distance (d), e.g. 8 inches, from the rotation axis 110. The boundary lines 152, 154 approximate the magnetic boundary field lines between the majority north field and the minority south field in the arrangements 104C, 104D. The arrangement of magnets 106 generates a magnetic field force that forces a perturbation element 108, if present, towards a default direction D. The perturbation and operation of the arrangements 104C, 104D are substantially as discussed above in connection with other embodiments. One or both of the perturbation points 116G, 116H may have the perturbation element 108 actuated therein in order to perturb the asymmetric magnetic field(s). The resulting tangential magnetic forces 320C, 320D from the perturbation(s) on the arrangements 104C, 104D, which is in a direction opposite to the default direction D, will cause the rotating body 102 to rotate about the rotation axis 110. Each arrangement 104C, 104D is arranged in an optional housing 300C, 300D. Also, any number of the arrangements 104C or 104D may be disposed around the perimeter of the rotating body 102.

Figure 17A:
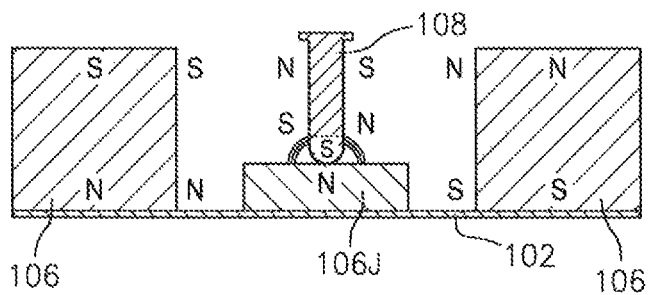
FIG. 17A is a schematic cross-sectional view of a permanent magnet arrangement of the permanent magnet asymmetric field system of FIG. 15 in accordance with embodiments of the present disclosure.
Figure 17B:
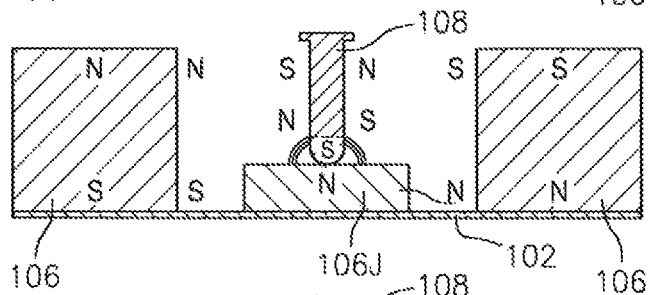
FIG. 17B is another schematic cross-sectional view of the permanent magnet arrangement of the permanent magnet asymmetric field system of FIG. 15 in accordance with embodiments of the present disclosure.
Figure 17C:
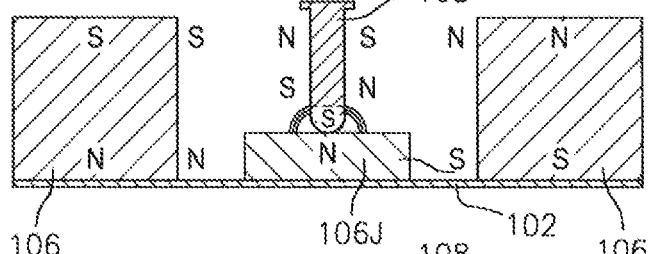
FIG. 17C is another schematic cross-sectional view of the permanent magnet arrangement of the permanent magnet asymmetric field system of FIG. 15 in accordance with embodiments of the present disclosure.
Figure 17D:
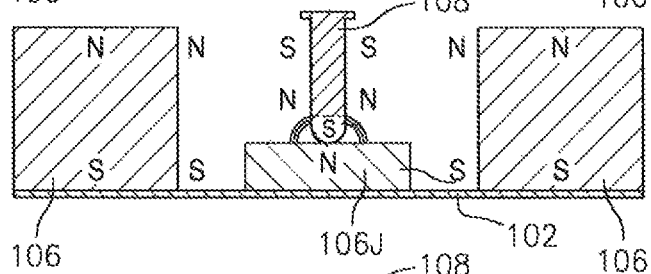
FIG. 17D is another schematic cross-sectional view of the permanent magnet arrangement of the permanent magnet asymmetric field system of FIG. 15 in accordance with embodiments of the present disclosure.
Figure 17E:
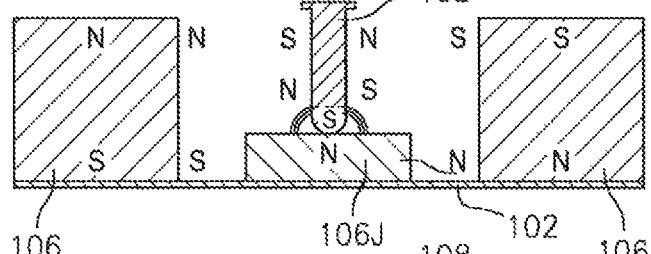
FIG. 17E is another schematic cross-sectional view of the permanent magnet arrangement of the permanent magnet asymmetric field system of FIG. 15 in accordance with embodiments of the present disclosure.
Figure 17F:
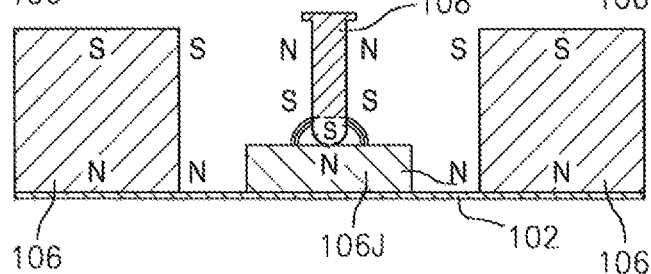
FIG. 17F is another schematic cross-sectional view of the permanent magnet arrangement of the permanent magnet asymmetric field system of FIG. 15 in accordance with embodiments of the present disclosure.

A schematic cross-sectional view of the permanent magnet arrangement 104D along line 17A is shown in FIG. 17A; along line 17B in FIG. 17B; along line 17C in FIG. 17C; along line 17D in FIG. 17D; along line 17E in FIG. 17E; and along line 17F in FIG. 17F. Similar to the polarity of the perturbation element 108 when arranged in the permanent magnet arrangement 104B shown in FIGS. 16A-16F, as shown in FIGS. 17A-17F, when a ferrous body perturbation element 108 is arranged at the perturbation point 116H, the perturbation element 108 has an opposite polarity as the polarity of the magnet 106 at a portion of the perturbation element 108 facing the permanent magnet 106. For example, as shown in FIG. 17A, the top left portion of the perturbation element 108 has a north polarity as it is facing the left permanent magnet 106, which has a south polarity at that height (in the direction of the extension of the perturbation element 108); and the bottom left portion of the perturbation element 108 has a south polarity as it is facing the left permanent magnet 106, which has a north polarity at that height. This is true for each portion of the perturbation element 108 facing each magnet 106. In contrast to the polarity pattern shown in FIGS. 16A-16F, due to the perturbation element 108 in FIGS. 17A-17F being arranged above or at the central permanent magnet 106J, the portion facing central permanent magnet 106J will have a polarity opposite to the polarity of the side of the central permanent magnet 106J facing the perturbation element 108. In this case, the side of the central permanent magnet 106J is north and, thus, the polarity of the bottom portion of the perturbation element 108 facing the central permanent magnet 106J is south.

Figure 15:
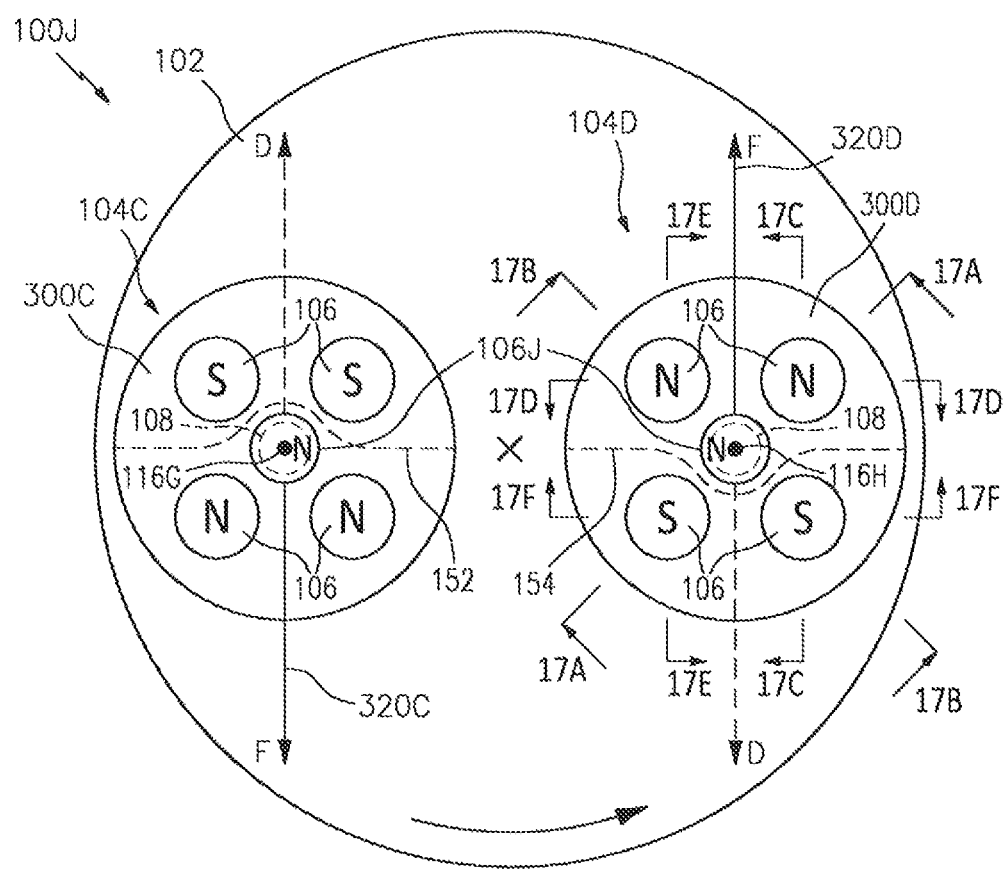
FIG. 15 is a top view of the permanent magnet asymmetric field system of FIG. 14 in accordance with embodiments of the present disclosure.

Referring to FIG. 15, the four outer magnets 106 may be cylindrical (or disc) magnets having a diameter of 1¼", and a thickness (or height) of ½" and the center bias magnet 106J may be a cylindrical (or disc) magnet having a diameter of ¾", and thickness (or height) of ¼". The bias magnet 106J may be centered geometrically in the configuration to provide the most efficient and effective operation; however, if the bias magnet 106J is not centered, the system 100J will still operate, but may be less efficient and/or effective. The space between the magnets 106 may be made as small as possible or may be zero (i.e., touching), depending on the desired performance. The closer the spacing, the stronger the resultant magnetic field strength on the perturbation element 108 and more magnetic energy may be provided and the less displacement is needed (and more input force) on the perturbation element (or actuator) 108 to initiate motion. Also, the magnets 106, 106J may be any shape, e.g. round, oval, square, rectangular, triangle, parallelogram, or any other polygon shape, as long as the polarities are the same as that described herein. For example, the outer magnets 106 may be rectangular magnets having a length of 1" a width of ½" and a thickness (or height) of ¼". In some embodiments, displacement of the perturbation element (or actuator) 108 by 1 mm-2 mm is sufficient to generate motion.

Also, the ferrous body perturbation element (or actuator) 108, may be rounded or come to a point or a rounded point at the end (or pivoting end) that touches (or contacts) the bias magnet 106J. The ferrous body perturbation element 108 acts as a flux concentrator in the region where the pivoting end contacts the bias magnet 106J. In particular, the magnetic field is concentrated in the pointed tip of the pivot end which is shown as a south S polarization (but may have a north N polarization in other embodiments). This polarization creates a localized magnetic field between the element 108 and the bias magnet 106J, which increases the magnetic field strength and the resulting magnetic attraction or attractive magnetic forces, thereby enhancing the effect of an applied force to create motion. Also, thereby may be a small divot (not shown) in the center of the magnet 106J for the perturbation element 108 tip to rest to avoid sliding. Such a divot may also be used in the system of FIG. 8 to keep the perturbation element 108 at the perturbation point 116.

As discussed herein, when an input force is applied to the element 108, it perturbs the asymmetric field to cause a release of potential energy to cause motion (rotational or translational). As also discussed herein, systems according to the principles of the present disclosure may operate using magnetic attraction forces acting between the perturbation element 108 and the magnets in the system.

Also, if the polarity of the bias magnet 106J is reversed, the system will rotate or translate in the opposite direction. Also, the substrate 102 that the magnets are mounted to may be made of a non-ferrous material (e.g., plastic) or a ferrous material.

Figure 14:
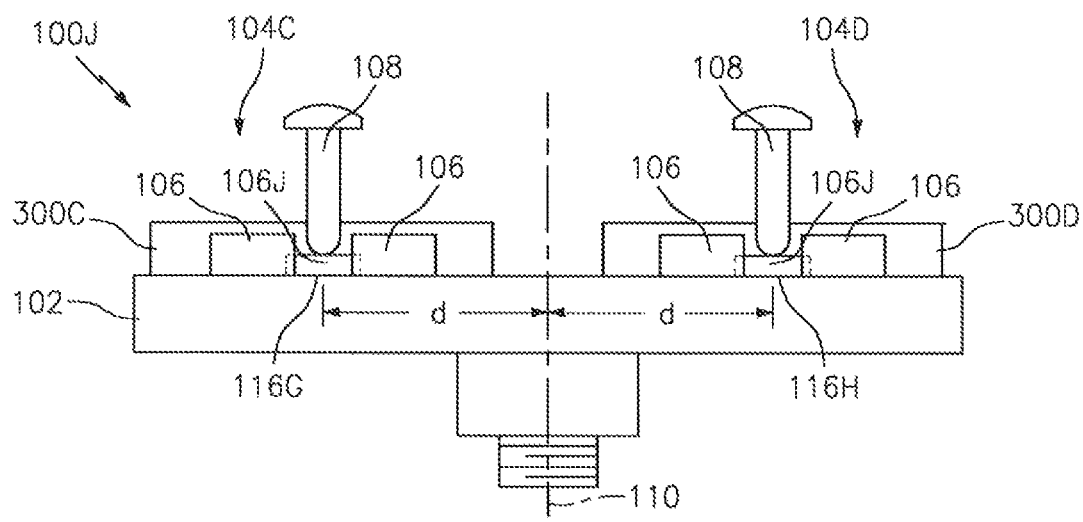
FIG. 14 is a side view of a permanent magnet asymmetric field system in accordance with embodiments of the present disclosure.
Figure 18:
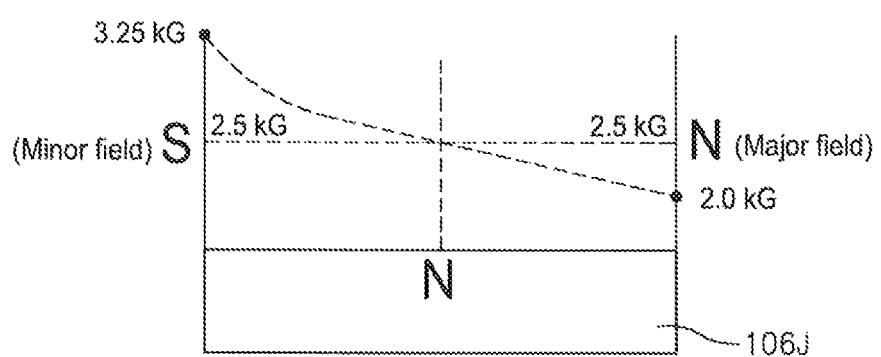
FIG. 18 is a diagram of the magnetic flux density from the minor field to the major field along the upper surface of a central permanent magnet of a permanent magnet arrangement of the permanent magnet asymmetric field system of FIG. 15 in accordance with embodiments of the present disclosure.

Referring to FIG. 18, is a diagram of the magnetic flux density from the minor field to the major field along the upper surface of a central permanent magnet (or bias magnet) 106J of the permanent magnet arrangement 104D of the permanent magnet asymmetric field system 100J of FIG. 14 in accordance with embodiments of the present disclosure. The diagram plots recorded magnetic flux density values of an exemplary system according to the system of FIG. 14, in which the recorded magnetic flux density is at 3.25 kG at one edge of the central permanent magnet 106J close to the minor field south S side and decreases to 2.0 kG at the opposite side of the magnet 106J close to the major field north N. The magnetic flux density is at 2.5 kG at the center of the central permanent magnet 106J. When the bias magnet 106J is measured alone (outside of the system 100J), the flux density across the surface is a constant at 2.5 kG. This shows that the magnetic field is distorted from its natural state when it is placed in the system configuration of FIG. 14.

Figure 19A:
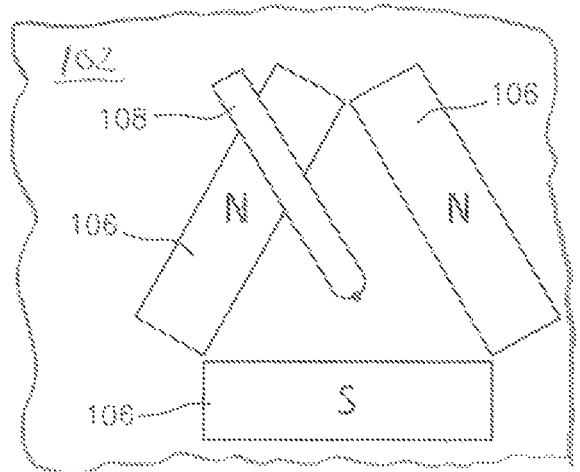
FIG. 19A is a top view of a permanent magnet arrangement for a permanent magnet asymmetric field system in accordance with embodiments of the present disclosure.

Referring to FIG. 19A, a top view a permanent magnet arrangement for a permanent magnet asymmetric field system is shown in accordance with embodiments of the present disclosure. The arrangement includes three permanent magnets and a perturbation element 108 arranged at a perturbation point. The three permanent magnets 106 are bar magnets with two of the magnets having their top sides having a north N polarity and the other magnet having its top side having a south S polarity. The perturbation and operation of the arrangement is substantially as discussed above in connection with other embodiments. The perturbation element 108 may be actuated to perturb the asymmetric magnetic field(s). The resulting magnetic force from the perturbation (s) on the arrangement will cause a body on which the magnets are arranged to rotate or move translationally.

Figure 19B:
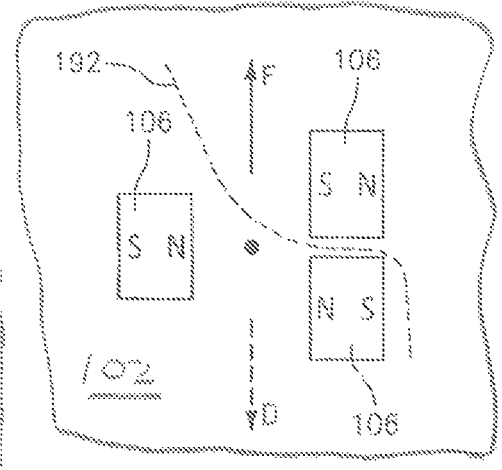
FIG. 19B is a top view of a permanent magnet arrangement for a permanent magnet asymmetric field system in accordance with embodiments of the present disclosure.

Referring to FIG. 19B, a top view of a permanent magnet arrangement for a permanent magnet asymmetric field system is shown in accordance with embodiments of the present disclosure. The magnets 106 are magnetized horizontally (polarized along a horizontal plane—parallel to a mounting substrate or plate or body 102). The boundary line 192 approximates the magnetic boundary field line between the majority north field and the minority south field in the arrangement. The structure and operation of the magnet arrangement is similar to other embodiments discussed herein and will not be repeated.

Although the embodiments of the present application have been shown and described as being configured with permanent magnets, it is within the scope of the present disclosure to make one or more of the magnets of any magnet arrangement described herein to be a permanent magnet, an electro magnet, or a permanent magnet and electro magnet combination. For example, referring to FIG. 20, a magnet arrangement for a magnet asymmetric field system is shown in accordance with embodiments of the present disclosure. The arrangement includes three electro magnets 106 that each include a coil 201 wrapped around a ferrous body to form each electro magnet 106. Each coil is configured to be energized with an electric current in one current direction to cause the electro magnet to become magnetized in one direction and/or to be energized with an electric current in a second current direction to cause the electro magnet 106 to become magnetized in a second direction, which is opposite to the first direction. In some embodiments, the strength of the energizing current to the coils 201 is configured to be changed such that the strength of the magnetic field generated by the electro magnet 106 is selectable or adjustable or controllable.

Figure 20:
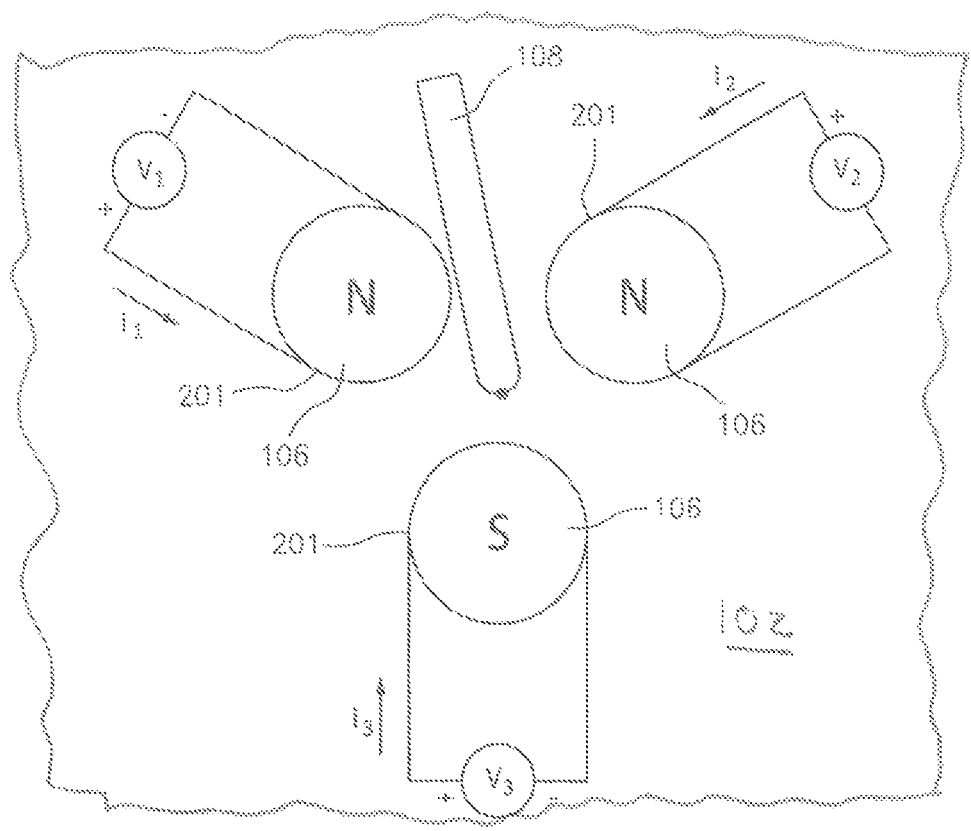
FIG. 20 is a top view of a magnet arrangement for a magnet asymmetric field system in accordance with embodiments of the present disclosure.

In the embodiment of FIG. 20, the two top electro magnets 106 are energized with current $i_1$, $i_2$ in the same direction to cause the magnets 106 to become magnetized with a top side of the electro magnets 106 showing a north N polarity, and the bottom magnet 106 is energized with a current $i_3$ in the opposite direction to cause the magnet 106 to become magnetized with a top side of the electro magnets 106 showing a south S polarity. As discussed above, the electro magnets 106 may be individually selectively energized in direction and/or strength to cause the electro magnets 106 to become magnetized as desired. The energizing of the coils 201 can be controlled by a controller (or other control unit(s)) that controls or provides instructions for voltage sources $V_1$, $V_2$, $V_3$ connected to the coils 201. For example, the energizing of the electro magnets 106 may be reversed to cause the top two magnets 106 to have a south S polarity on top and the bottom magnet 106 to have a north N polarity on top. Then actuation of the perturbation element 108 in the opposite direction can cause a magnetic force in the opposite direction than the previous magnetization arrangement. While all of the magnets 106 are shown as electro magnets 106, it is within the scope of the present application for one or more of the magnets 106 to be permanent magnets. In some embodiments, the electro magnets 106 may be coils wrapped around permanent magnets.

Figure 21:
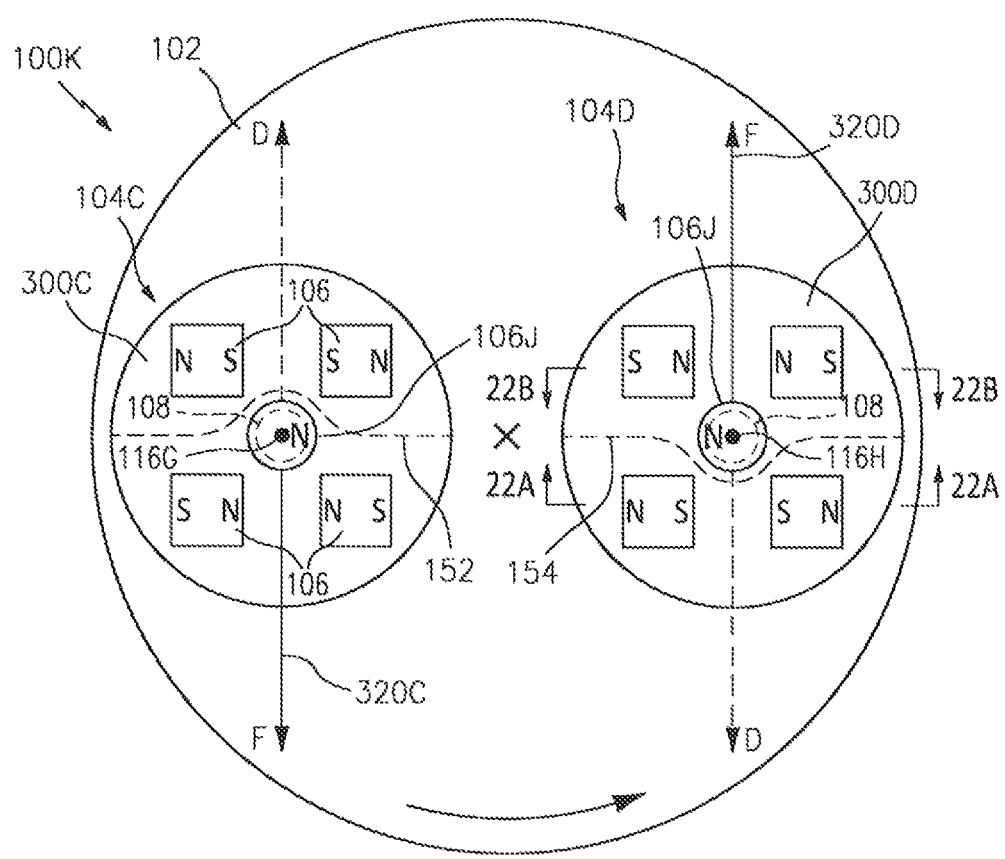
FIG. 21 is a top view of a permanent magnet asymmetric field system in accordance with embodiments of the present disclosure.

Referring to FIG. 21, a top view of alternative permanent magnet asymmetric field system 100K is shown in accordance with embodiments of the present disclosure. In this alternative embodiment, the permanent magnet arrangements are similar to the magnet arrangements 104 shown in FIGS. 8 and 14, except the magnets 106 are magnetized horizontally (polarized along horizontal plane) instead of magnetized vertically (polarized along a vertical plane) as in the arrangements shown in the FIGS. 8 and 14 embodiments. In other words, the inner and outer sides of the magnets 106 in a horizontal direction of FIG. 21 have a polarity north N or south S. The bias magnet 106J is magnetized vertically (polarized along a vertical plane—perpendicular to the body 102). The boundary lines 152, 154 approximate the magnetic boundary field lines between the majority north field and the minority south field in the arrangements 104C, 104D. The perturbation element 108 similarly has a polarity pattern opposite to side of the magnet 106 that portion of the perturbation element 108 is facing. In other words, the portions of the perturbation element 108 facing a magnet 106 with a south S side have a north N polarity, and the portions of the perturbation element 108 facing a magnet 106 with a north N side have a south S polarity. The perturbation element 108 has a bottom portion facing the central magnet 106J that is opposite to the polarity at the top side of the central magnet 106J, similar to the FIG. 15 embodiment. The structure and operation of the system 100K is similar to other embodiments discussed herein and will not be repeated.

Figure 22A:
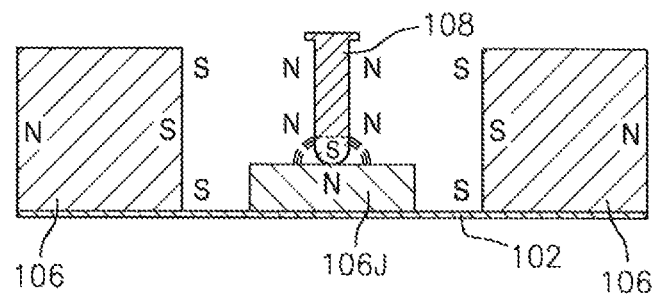
FIG. 22A is a schematic cross-sectional view of a permanent magnet arrangement of the permanent magnet asymmetric field system of FIG. 21 in accordance with embodiments of the present disclosure.
Figure 22B:
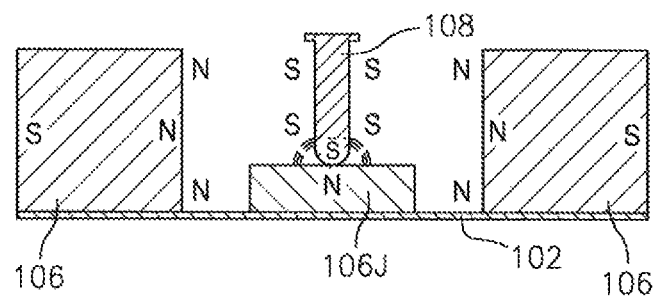
FIG. 22B is another schematic cross-sectional view of a permanent magnet arrangement of the permanent magnet asymmetric field system of FIG. 21 in accordance with embodiments of the present disclosure.

A schematic cross-sectional view of a permanent magnet arrangement of the permanent magnet asymmetric field system 100K of FIG. 21 along line 22A is shown in FIG. 22A; and along line 22B in FIG. 22B. Similar to the schematic cross-sectional views of FIGS. 16A-16F and 17A-17F, when a ferrous body perturbation element 108 is arranged at the perturbation point, the perturbation element 108 has an opposite polarity as the polarity of the magnet 106 at a portion of the perturbation element 108 facing the permanent magnet 106.

Figure 23:
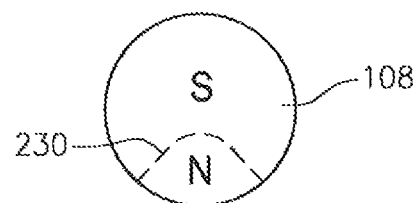
FIG. 23 is a cross-sectional polarity diagram of a perturbation element arranged in the permanent magnet asymmetric field system of FIG. 21 in accordance with embodiments of the present disclosure.

Referring to FIG. 23, a cross-sectional polarity diagram of a perturbation element 108 arranged in the permanent magnet asymmetric field system 100K of FIG. 21 is shown in accordance with embodiments of the present disclosure. The perturbation element 108 shows a mostly south S field given that the majority field of the magnet arrangement is a north N field. The boundary line 230 approximates the magnetic boundary field line between where the perturbation element 108 has a north polarity and a south polarity.

Figure 24:
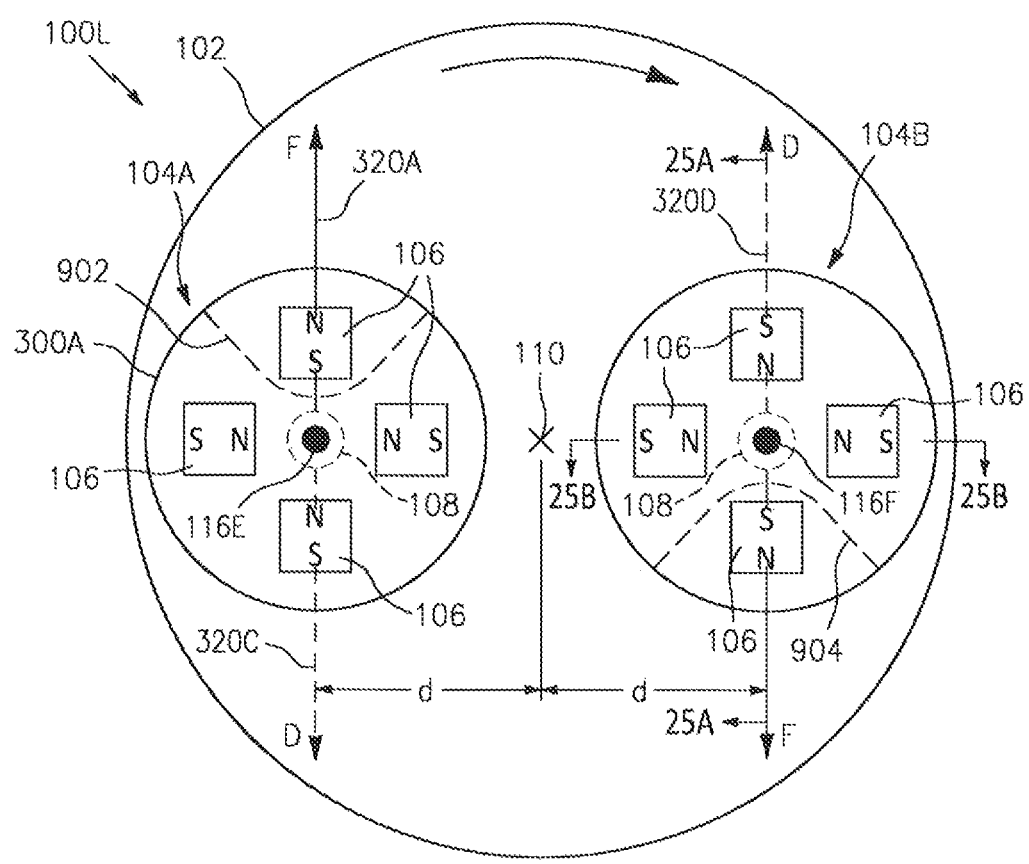
FIG. 24 is a top view of a permanent magnet asymmetric field system in accordance with embodiments of the present disclosure.

Referring to FIG. 24, a top view of a permanent magnet asymmetric field system 100L is in accordance with embodiments of the present disclosure. The system 100L is similar to the system 100K of FIG. 21, except that there is no central bias magnet 106J arranged at the perturbation point 116. The magnet arrangement 104 otherwise is the same and has horizontally magnetized magnets 106 as opposed to the vertically magnetized magnets of the systems of FIGS. 8 and 14. The boundary lines 902, 904 approximate the magnetic boundary field lines between the majority north field and the minority south field in the arrangements 104A, 104B.

A schematic cross-sectional view of a permanent magnet arrangement of the permanent magnet asymmetric field system 100L of FIG. 24 along line 25A is shown in FIG. 25A; and along line 25B in FIG. 25B. Similar to the schematic cross-sectional views of FIGS. 16A-16F, 17A-17F and 22A-22B, when a ferrous body perturbation element 108 is arranged at the perturbation point, the perturbation element 108 has an opposite polarity as the polarity of the magnet 106 at a portion of the perturbation element 108 facing the permanent magnet 106.

Referring to FIG. 26, a cross-sectional polarity diagram of a perturbation element 108 arranged in the permanent magnet asymmetric field system 100L of FIG. 24 is shown in accordance with embodiments of the present disclosure. The perturbation element 108 shows a mostly south S field given that the majority field of the magnet arrangement is a north N field. The boundary line 260 approximates the magnetic boundary field line between where the perturbation element 108 has a north polarity and a south polarity.

Referring to FIG. 27, a top view of a permanent magnet arrangement for a permanent magnet asymmetric field system is shown in accordance with embodiments of the present disclosure. The permanent magnet arrangement generates an asymmetric field 270 using two magnets 106 magnetized horizontally (polarized along a horizontal plane—parallel to a mounting substrate or plate 102), and a bias magnet 106J disposed between the two magnets 106, the bias magnet 106J being magnetized vertically (polarized along a vertical plane—perpendicular to the mounting substrate or plate or body 102) having a south pole pointing upward. The perturbation element (or actuator) 108 would be disposed on the bias magnet 106J, similar to that discussed herein with the embodiment of FIGS. 14-15, and a force applied in the F arrow direction, and the default position being in the D arrow direction.

Referring to FIG. 28, a top view of a permanent magnet arrangement for a permanent magnet asymmetric field system is shown in accordance with embodiments of the present disclosure. The permanent magnet arrangement generates an asymmetric field 280 using a single magnet 106 magnetized horizontally (polarized along a horizontal plane—parallel to a mounting substrate or plate 102), and a bias magnet 106J disposed at a horizontal distance close enough the magnet 106 to create the desired asymmetric field, e.g., about 1 inch. Other distances may be used if desired, depending on the desired asymmetric field strength and system performance requirements. The bias magnet 106J is magnetized vertically (polarized along a vertical plane—perpendicular to the mounting substrate or plate or body 102) having a south pole pointing upward. The perturbation element (or actuator) 108 would be disposed on the bias magnet 106J, similar to that discussed herein with the embodiment of FIGS. 14-15, and a force applied in the F arrow direction, and the default position being in the D arrow direction.

The bias magnet 106J may be a disc magnet as shown or be any desired shape, provided it has a magnetic polarity as described herein.

A bias magnet, e.g. bias magnet 106J, may be added to any of the embodiments at the perturbation point 116 to enhance the asymmetric field effect and/or performance. In some embodiments, the bias magnet may be arranged a distance away from perturbation point and/or where the perturbation element 108 is arranged to cause the body 102 to move, as discussed herein. In some embodiments, the bias magnet may be recessed below or into the body 102, which may further enhance the asymmetric field effect and/or performance.

Also, the perturbation element 108 need only be made of a ferrous material in the region where the flux field of the magnets are located and to a length or distance where the flux field effects on the element 108 do not affect desired performance, e.g., up to a predetermined distance above the top of the magnets. After this length or distance, the element 108 may be made of a non-ferrous material, such as plastic or other material. The actual distance or length will depend on the magnetic field strength of the configuration used and the desired performance output of the system.

The magnetic flux field boundary lines shown herein are approximate and indicative of the flux field when no perturbation element is positioned in the arrangement. The presence of the perturbation element 108 in any given arrangement may not substantially alter the flux field boundaries. Further, as the perturbation element 108 moves through the field (i.e., when a force is applied to the element 108), the cross-sectional magnetic field polarity and/or strength along the length of, or at any given location on, the element 108 (e.g., as shown in FIGS. 23 and 26) may shift or change based on the position of the element 108 in the flux field.

In embodiments according to the present disclosure, the magnets are arranged to work facilitating rotation in structures such as wind turbines, which may significantly reduce the input energy required to initiate rotation of the wind turbine.

Dimensions provided herein are approximate and other dimensions may be used if desired provided they provide the same function and performance described herein.

For the embodiments disclosed herein, the perturbation of the asymmetric field causes a release of potential energy from the permanent magnets into kinetic energy in the form of angular or linear (translational) velocity or acceleration. We have found that small input forces acting on the perturbation element positioned at or near parallel to the rotational axis (or perpendicular to the floor of the arrangement) causes an amplified output force due to such energy release (or conversion to kinetic energy).

While specific permanent magnet arrangements have been shown and described as generating the asymmetric magnetic field(s) about the perturbation point(s), it is within the scope of the present disclosure for the permanent magnet arrangement to be virtually any other shape or configuration, or number of magnets, as long as the arrangement is configured to generate an asymmetric magnetic field about the perturbation point(s). For instance, a permanent magnet arrangement that would otherwise generate a symmetric magnetic field about the perturbation point(s) but for the presence of magnetic field shielding, interfering or diverting structure(s) are within the scope of the present disclosure, i.e. the magnetic field shielding, interfering or diverting structure(s) ultimately causes the permanent magnet arrangement to generate an asymmetric field about the perturbation point(s).

The magnetic field lines shown and described herein are an approximation of the location of the magnetic fields. The actual shape and location of the magnetic fields or field lines may be different than as shown and/or may vary based on physical characteristics and materials of the system.

It should be readily understood that the magnetic polarity of the magnets of the systems and methods described herein can be reversed and achieve the same intended function and structure. Specifically, a magnet side (or surface) having north pole N polarity may instead have south pole S polarity and a magnet side (or surface) having south pole S polarity may instead have north pole N polarity, and the permanent magnet asymmetric systems and methods will function substantially the same as disclosed herein.

While the present disclosure has shown and described the permanent magnets as being circular flat magnets, cylindrical magnets and bar magnets, it should be readily understood that any permanent magnet shape is within the scope of the present disclosure. The magnet(s) may differ in shape and type. For example, the cylindrical magnets may be cylinders and/or cylinders with a central bore or hole defined therein in a longitudinal direction of the cylindrical magnet(s). Instead of the central bore (or in addition thereto), the magnets may be provided with blind bores. Magnets may be configured with the necessary central bore and/or blind bores for enhancing the magnetic fields thereof or generating the desired magnetic fields thereof. Other magnet shapes, such as rectangular magnets or flat magnets, may have transverse (through the thickness) bores or holes or blind bores for enhancement or desired magnetic field shapes/strengths. Further, while various magnets have been described as being separate magnets, it is within the scope of the present disclosure for the magnets to form a single, unitary piece or structure. Also, any given permanent magnet described herein may comprise a plurality of smaller permanent magnets that are stacked together to perform the same function and polarity as the given permanent magnet, if desired.

Although the invention has been described and illustrated with respect to exemplary embodiments thereof, the foregoing and various other additions and omissions may be made therein and thereto without departing from the spirit and scope of the present disclosure. It should be understood that, unless otherwise explicitly or implicitly indicated herein, any of the features, characteristics, alternatives or modifications regarding a particular embodiment herein may also be applied, used, or incorporated with any other embodiment described herein.

What is claimed is:

1. A permanent magnet asymmetric field system for moving a body, comprising:
   a rotating body configured to rotate about a rotation axis;
   a permanent magnet arrangement disposed on the rotating body, the permanent magnet arrangement comprising three permanent magnets; and
   a perturbation element;
   wherein the permanent magnet arrangement is configured such that an asymmetric magnetic field is generated by the permanent magnets about a perturbation point;
   wherein two of the three permanent magnets are polarized in a first direction and one of the three permanent magnets is polarized in a second direction, the first direction being perpendicular to the second direction;
   wherein actuation of the perturbation element at or near the perturbation point with an input force causes a tangential magnetic output force on the rotating body or the permanent magnet arrangement, thereby causing the rotating body to rotate about the rotation axis; and
   wherein the actuation of the perturbation element causes a perturbation of the asymmetric field causing a release of potential energy from the permanent magnet arrangement to create the output force causing the rotation.

2. The permanent magnet asymmetric field system according to claim 1, wherein the perturbation element comprises a ferrous material.

3. The permanent magnet asymmetric field system according to claim 2, wherein the perturbation element comprises iron.

4. The permanent magnet asymmetric field system according to claim 1, wherein the perturbation element comprises a magnet.

5. The permanent magnet asymmetric field system according to claim 4, wherein the magnet is a conical magnet.

6. The permanent magnet asymmetric field system according to claim 1, wherein the permanent magnet polarized in the second direction is radially aligned with the perturbation point, and wherein the two permanent magnets polarized in the first direction are not radially aligned with the perturbation point.

7. The permanent magnet asymmetric field system according to claim 1, further comprising an actuation input device configured to actuate the perturbation element.

8. The permanent magnet asymmetric field system according to claim 1, wherein the permanent magnet polarized in the second direction comprises a cylindrical bias magnet and the magnets polarized in the first direction comprise rectangular wall magnets.

9. The permanent magnet asymmetric field system according to claim 1, wherein the asymmetric magnetic field comprises a major field and a minor field, and wherein the major field is larger than the minor field and/or the major field has greater magnetic field strength than the minor field.

10. The permanent magnet asymmetric field system according to claim 9, wherein actuation of the perturbation element at or near the perturbation point causes the perturbation element to deviate from a perturbation axis, and wherein the perturbation axis is substantially parallel to the rotation axis.

11. A permanent magnet asymmetric field system for rotating a body, comprising:
a rotating body configured to rotate about a rotation axis;
a permanent magnet arrangement disposed on the rotating body, the permanent magnet arrangement comprising two groups of three permanent magnets; and
a first perturbation element;
wherein the permanent magnet arrangement is configured such that an asymmetric magnetic field is generated by the permanent magnets about a plurality of perturbation points;
wherein, for each group of the two groups of three permanent magnets, two of the three permanent magnets are polarized in a first direction and one of the three permanent magnets is polarized in a second direction, the first direction being perpendicular to the second direction; and
wherein actuation of the first perturbation element at or near one of the perturbation points causes a first tangential magnetic force on the rotating body and/or the permanent magnet arrangement, thereby causing the rotating body to rotate about the rotation axis in a first direction.

12. The permanent magnet asymmetric field system according to claim 11, further comprising a second perturbation element, wherein actuation of the second perturbation element at or near one of the perturbation points causes a second tangential magnetic force on the rotating body and/or the permanent magnet arrangement, thereby causing the rotating body to rotate about the rotation axis in a second direction, and wherein the second direction is opposite to the first direction.

13. The permanent magnet asymmetric field system according to claim 11, further comprising a second perturbation element, wherein actuation of the second perturbation element at or near one of the perturbation points causes a second tangential magnetic force on the rotating body and/or the permanent magnet arrangement, thereby causing the rotating body to rotate about the rotation axis in the first direction.

14. The permanent magnet asymmetric field system according to claim 11, wherein the asymmetric magnetic field comprises a major field and a minor field, and wherein the major field is larger than the minor field and/or the major field has greater magnetic field strength than the minor field.

15. The permanent magnet asymmetric field system according to claim 14, wherein actuation of the perturbation element at or near the perturbation point causes the perturbation element to deviate from a perturbation axis, and wherein the perturbation axis is substantially parallel to the rotation axis.

16. The permanent magnet asymmetric field system according to claim 11, wherein, for each group of the two groups of three permanent magnets, the permanent magnet polarized in the second direction is radially aligned with a respective perturbation point of the perturbation points, and wherein the two permanent magnets polarized in the first direction are not radially aligned with the respective perturbation point.

17. A method of perturbing a permanent magnetic asymmetric field system to move a body, comprising:
providing a permanent magnetic asymmetric field system comprising:
a rotating body configured to rotate about a rotation axis;
a permanent magnet arrangement disposed on the rotating body, the permanent magnet arrangement comprising three permanent magnets; and
a perturbation element;
wherein the permanent magnet arrangement is configured such that an asymmetric magnetic field is generated by the permanent magnets about a perturbation point;
wherein two of the three permanent magnets are polarized in a first direction and one of the three permanent magnets is polarized in a second direction, the first direction being perpendicular to the second direction;
actuating the perturbation element at or near the perturbation point to cause a tangential magnetic force on the rotating body and/or the permanent magnet arrangement, thereby causing the rotating body to rotate about the rotation axis.

18. The method according to claim 17, wherein the actuating of the perturbation element causes the perturbation element to deviate from a perturbation axis, and wherein the perturbation axis is substantially parallel to the rotation axis.

19. The method according to claim 17, wherein the actuating of the perturbation element actuates the perturbation element from an initial position where a longitudinal extension of the perturbation element is perpendicular to a surface of the rotating body at the perturbation point.

20. The permanent magnet asymmetric field system according to claim 17, wherein the permanent magnet polarized in the second direction is radially aligned with the perturbation point, and wherein the two permanent magnets polarized in the first direction are not radially aligned with the perturbation point.

21. A permanent magnet asymmetric field system for a moving body, comprising:
a moveable body;
a permanent magnet arrangement disposed on the moveable body, the permanent magnet arrangement comprising three permanent magnets; and
a perturbation element;
wherein two of the three permanent magnets are polarized in a first direction and one of the three permanent magnets is polarized in a second direction, the first direction being perpendicular to the second direction;
wherein the permanent magnet arrangement is configured such that an asymmetric magnetic field is generated by the permanent magnets about a perturbation point;
wherein actuation of the perturbation element at or near the perturbation point with an input force causes a magnetic output force on the moveable body or the permanent magnet arrangement, thereby causing the moveable body to move; and wherein the actuation of the perturbation element causes a perturbation of the asymmetric field causing a release of potential energy from the permanent magnet arrangement to create the output force causing the movement.

22. The permanent magnet asymmetric field system according to claim 21, wherein the movement is rotational movement or translational movement.

23. The permanent magnet asymmetric field system according to claim 1, wherein the perturbation element comprises a rounded end at the end nearest to the perturbation point.

24. The permanent magnet asymmetric field system according to claim 23, wherein the rounded end of the perturbation element acts as a flux concentrator near the perturbation point.

25. The permanent magnet asymmetric field system according to claim 1, wherein the permanent magnet arrangement defines a flux field along the perturbation element, and wherein perturbation element comprises a ferrous material within at least a portion of the flux field.

26. The permanent magnet asymmetric field system according to claim 1, wherein the permanent magnet arrangement defines a flux field along the perturbation element, and wherein perturbation element comprises a ferrous material within at least a portion of the flux field and comprises a non-ferrous material at a predetermined distance above the permanent magnet arrangement.

27. The permanent magnet asymmetric field system according to claim 17, wherein the perturbation element comprises a rounded end at the end nearest to the perturbation point.

28. The permanent magnet asymmetric field system according to claim 27, wherein the rounded end of the perturbation element acts as a flux concentrator near the perturbation point.

29. The permanent magnet asymmetric field system according to claim 17, wherein the permanent magnet arrangement defines a flux field along the perturbation element, and wherein perturbation element comprises a ferrous material within at least a portion of the flux field.

30. The permanent magnet asymmetric field system according to claim 17, wherein the permanent magnet arrangement defines a flux field along the perturbation element, and wherein perturbation element comprises a ferrous material within at least a portion of the flux field and comprises a non-ferrous material at a predetermined distance above the permanent magnet arrangement.

* * * * *